US008717600B2

(12) United States Patent
Yabe

(10) Patent No.: US 8,717,600 B2
(45) Date of Patent: May 6, 2014

(54) NETWORK SYSTEM, NETWORK SYSTEM CONTROL METHOD, AND STORAGE MEDIUM

(75) Inventor: Kenta Yabe, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 465 days.

(21) Appl. No.: 13/030,894

(22) Filed: Feb. 18, 2011

(65) Prior Publication Data

US 2011/0205588 A1 Aug. 25, 2011

(30) Foreign Application Priority Data

Feb. 22, 2010 (JP) .................................. 2010-036173

(51) Int. Cl.
*G06K 15/00* (2006.01)
*G06F 3/12* (2006.01)

(52) U.S. Cl.
USPC ........ 358/1.15; 358/1.13; 358/1.14; 358/1.16

(58) Field of Classification Search
USPC ....................................................... 358/1.15
See application file for complete search history.

(56) References Cited

U.S. PATENT DOCUMENTS

| 7,167,262 | B2* | 1/2007 | Muramoto et al. | 358/1.15 |
| 2004/0145772 | A1* | 7/2004 | Stringham | 358/1.15 |
| 2005/0275885 | A1* | 12/2005 | Sugiyama | 358/1.15 |
| 2006/0268315 | A1* | 11/2006 | Randt | 358/1.15 |

FOREIGN PATENT DOCUMENTS

| JP | 2002-304271 A | 10/2002 |
| JP | 2005-100348 A | 4/2005 |
| JP | 2008-040718 A | 2/2008 |

* cited by examiner

*Primary Examiner* — Huo Long Chen
(74) *Attorney, Agent, or Firm* — Canon USA, Inc., IP Division

(57) ABSTRACT

A network system includes a first processing unit configured to accept a request transmitted from a client computer and register a job that processes the accepted request into a storage unit. The first processing unit includes one or a plurality of processing units. The network system further includes a second processing unit configured to acquire the job from the storage unit asynchronously with the job being registered into the storage unit and process the acquired job. The second processing unit includes one or a plurality of processing units. The first processing unit transmits authentication information usable to acquire a processing result of the job corresponding to the request to the client computer without waiting for the second processing unit to complete processing of the job registered in the storage unit.

13 Claims, 25 Drawing Sheets

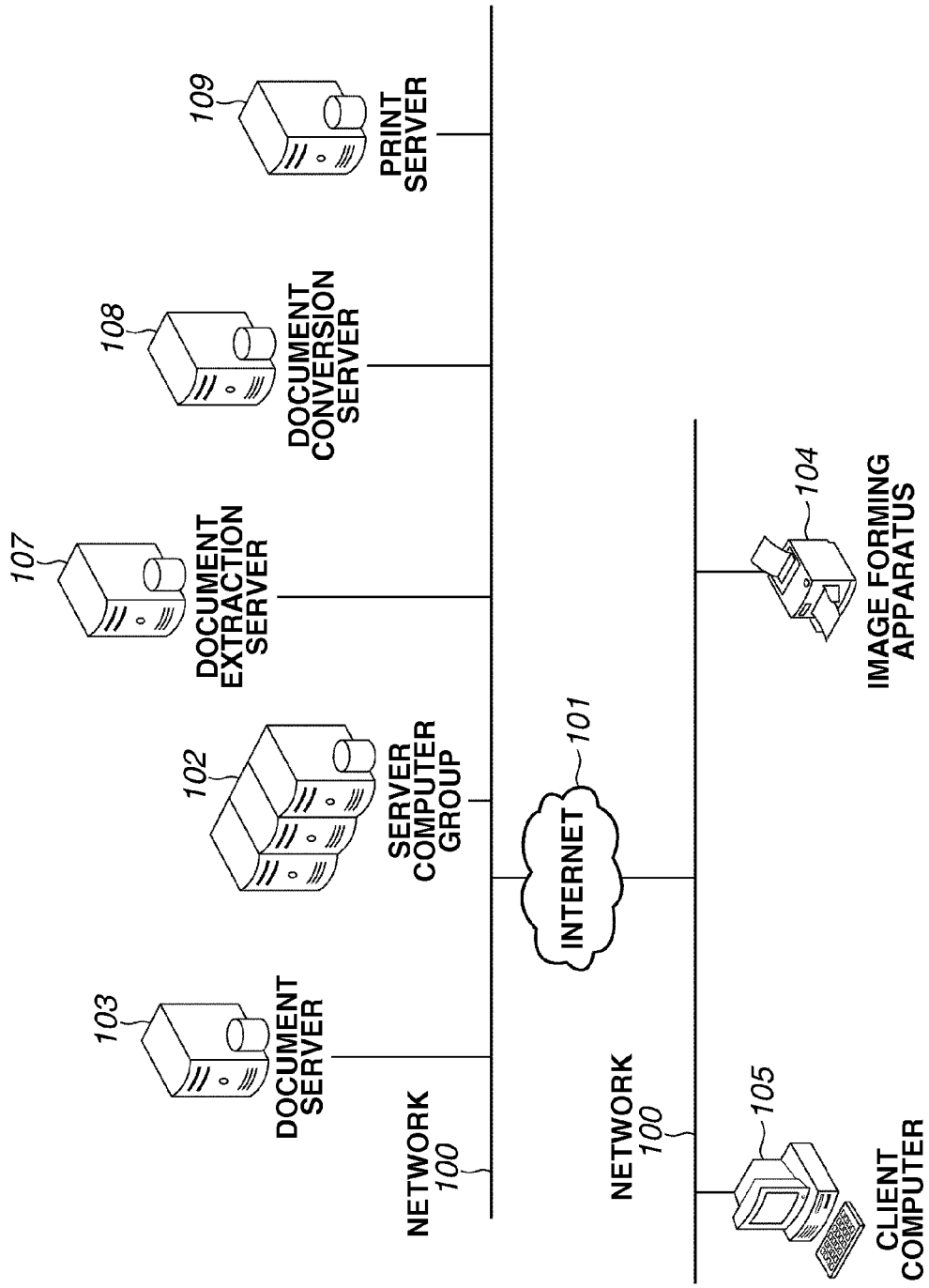

FIG.6

Request:
PUT http://print-sv.queue.net:10001/dev_0001queue/messages ~601

Headers: ~602
x-ms-date:Mon,14 Sep 2009 17:00:25 GMT
Authorization:SharedKey dev_0001queue:sr8rIheJmCd6npMSx7DfAY3L//V3uWvSXOzUBCV9wnk=

Body:
<QueueMessage>
<MessageText>pk01|job01<MessageText> ~603
</QueueMessage>

FIG.8

| ETag | Partition Key | Row Key | URI | Type | Attribute |
|---|---|---|---|---|---|
| awe4jsm | service | service01 | http://xxx/connector/download | In | http://docserver/library |
| judjtgh | service | service02 | http://yyy/converter/pdf | Pipe | |
| gawegwe | service | service03 | http://zzz/printservice/print | Out | http://printserver/ |

| ETag | Partition Key | Row Key | MaxTask | Task1 | Task2 | Task3 | ... | Task19 | Task20 |
|---|---|---|---|---|---|---|---|---|---|
| hjaoerke | sequence | seq01 | 3 | service01 | service02 | service03 | ... | | |
| er4lseaa | sequence | seq02 | 2 | service01 | service03 | | ... | | |

901 902 903 904 905 906 907 908 909

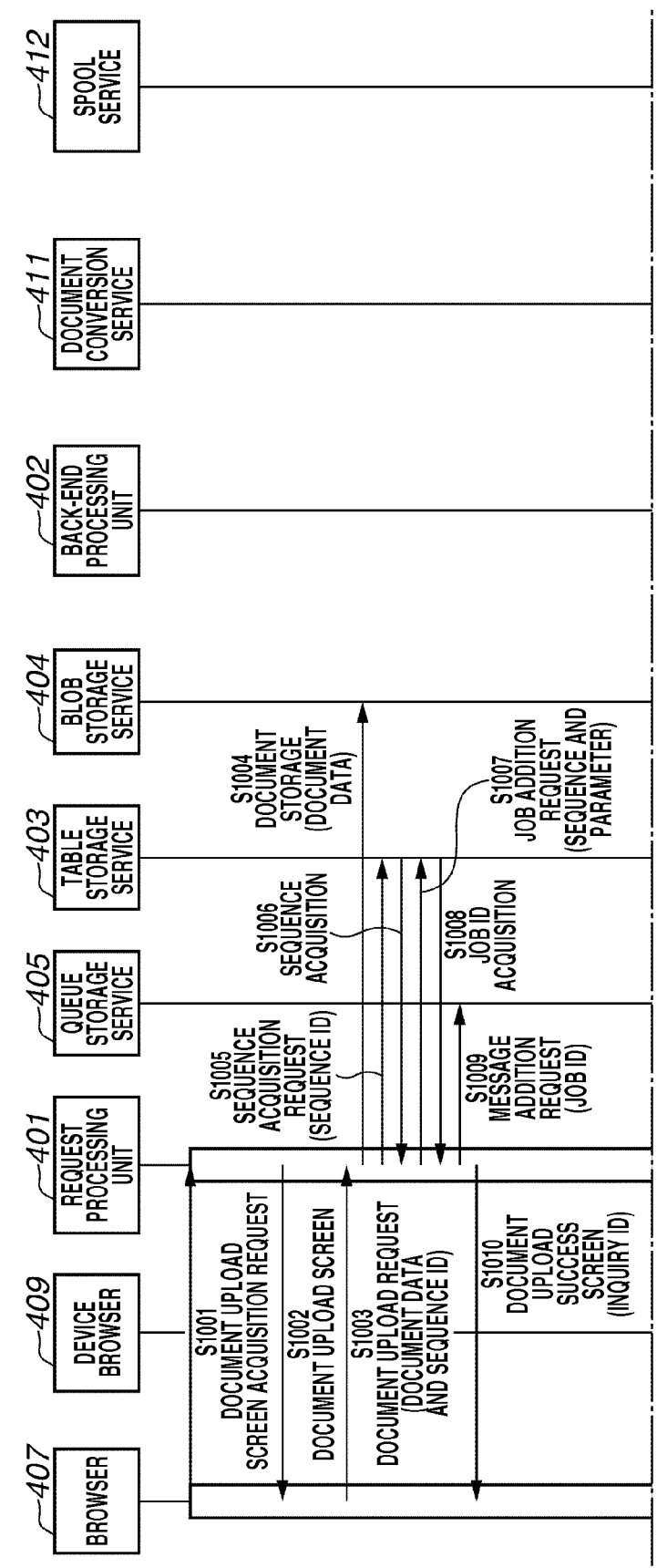

FIG.12
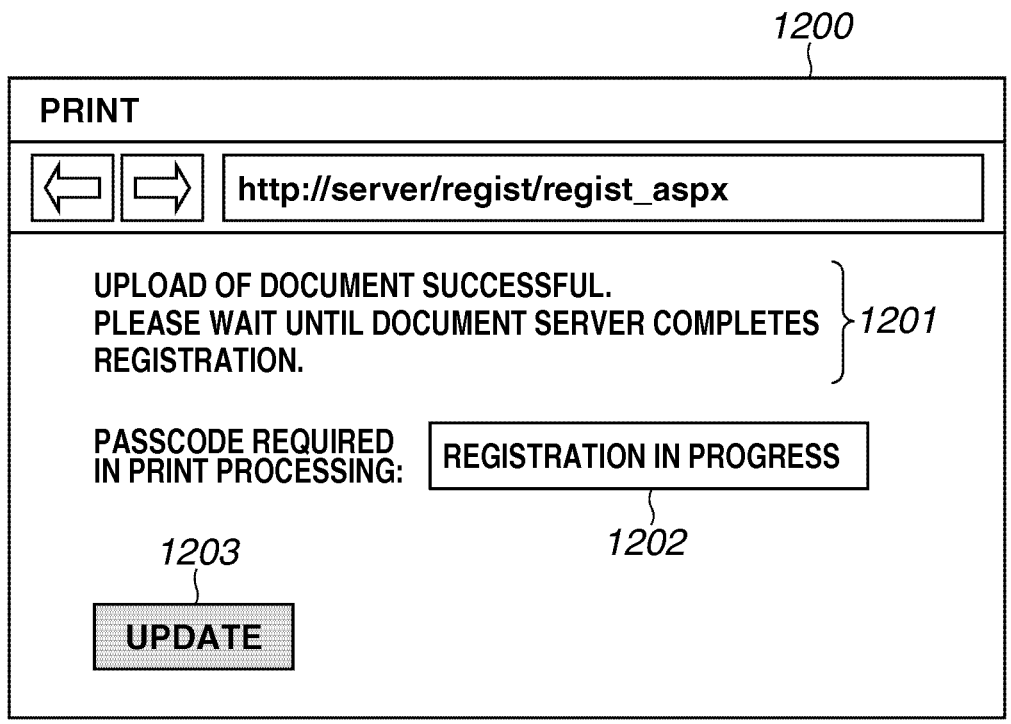
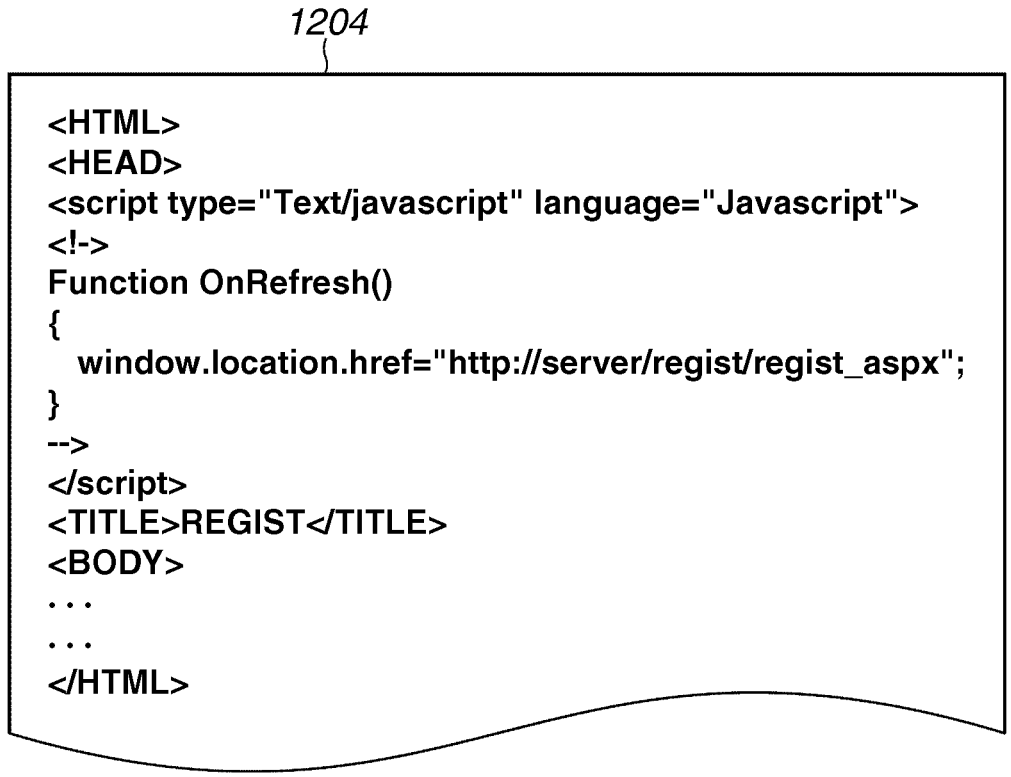

FIG.13

| ETag | Partition Key | Row Key | RquestID |
|---|---|---|---|
| Yhfr765g | pk01 | job01 | 2010/1/1 9:01:55 |

*1301* *1302* *1303* *1304*

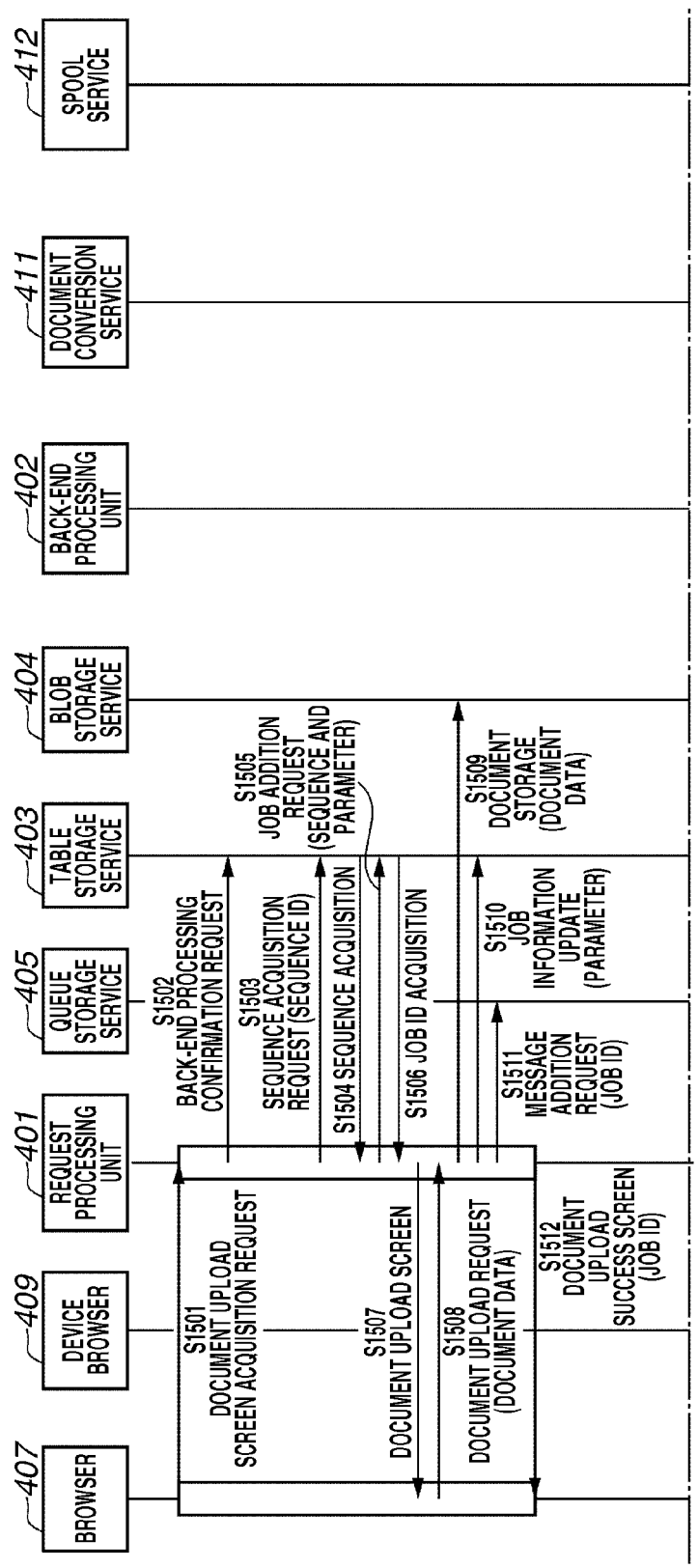

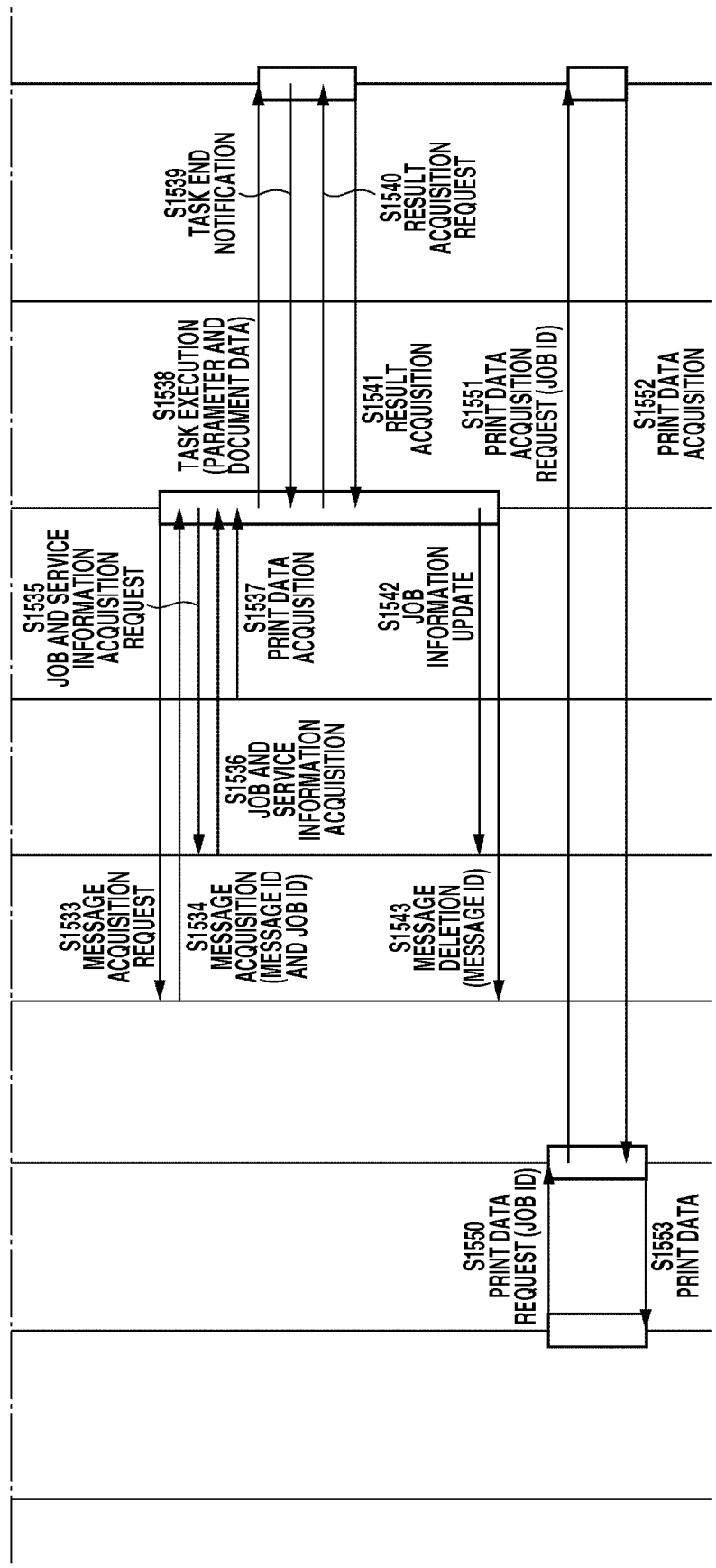

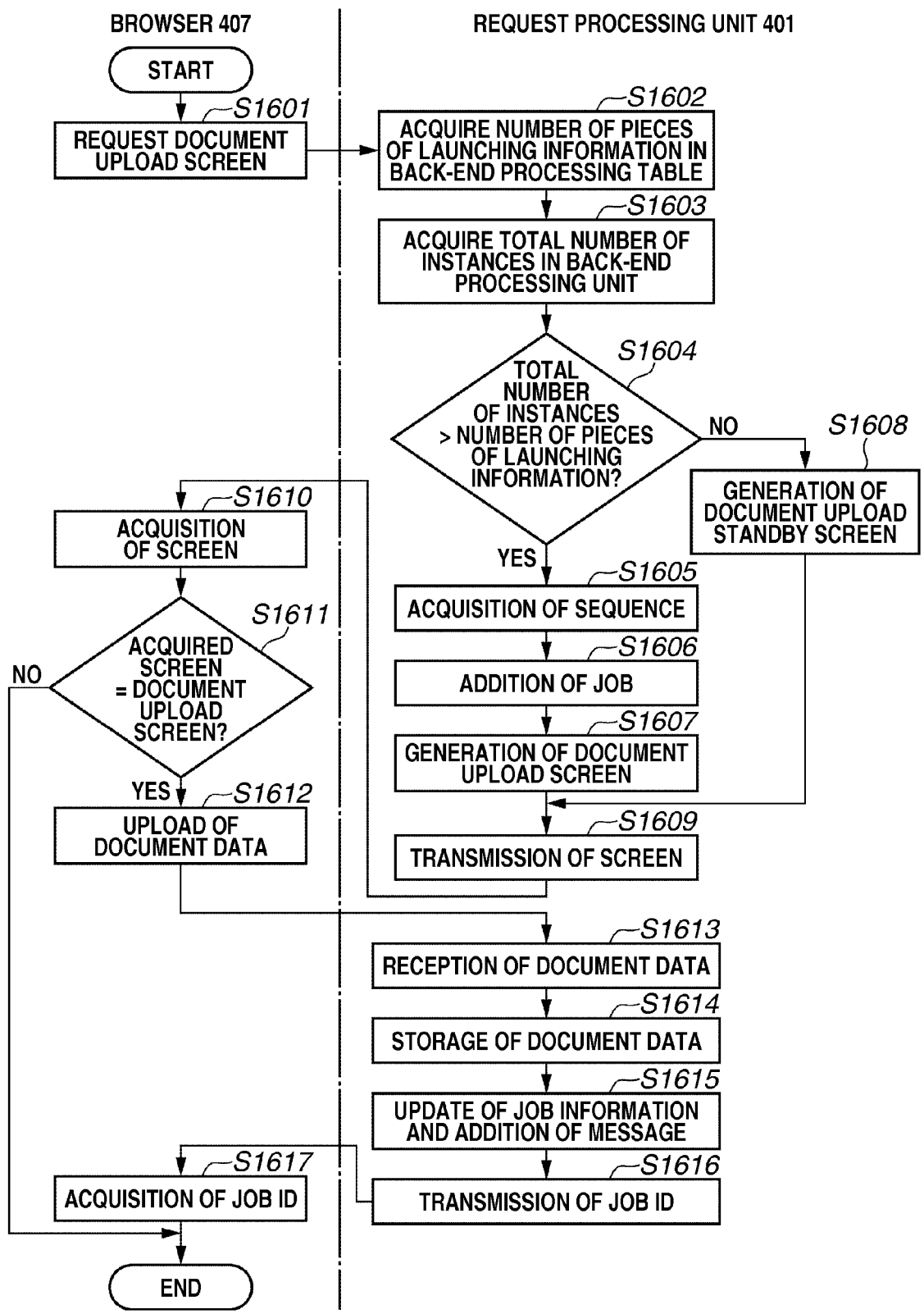

FIG.17

| ETag | Partition Key | Row Key | Input Time |
|---|---|---|---|
| abcdefg12 | pk01 | job01 | 2010/1/1 9:01:55 |
| faraighaio | pk02 | job02 | 1900/1/1 00:00:00 |

```
<?xml version="1.0"?>
<ServiceConfiguration>
     <Role name="XXX">
          <Instances count="5"/>  ~1802
          . . .
          . . .
          . . .
     </Role>
</ServiceConfiguration>
```

```
PRINT
┌──┐┌──┐ ┌─────────────────────────────┐
│⇐ ││⇒ │ │ http://server/regist/regist_aspx │
└──┘└──┘ └─────────────────────────────┘

UPLOAD OF DOCUMENT SUCCESSFUL. ~2001

PASSCODE REQUIRED
IN PRINT PROCESSING: pk1job1 ~2002
```

NETWORK SYSTEM, NETWORK SYSTEM CONTROL METHOD, AND STORAGE MEDIUM

BACKGROUND OF THE INVENTION

1. Field of the Invention

The present invention relates to a network system, a method for controlling the network system, and a storage medium.

2. Description of the Related Art

A content management system using Internet techniques enables a user of a client computer to access a web page provided by a server computer via the Internet and to select a content to view from the web page. The content management system transmits the selected content to the server computer. The server computer processes and displays the received content on its display device.

As discussed in Japanese Patent Application Laid-Open No. 2002-304271, there is a conventional method for causing a printer to print a content that a user has viewed on a client computer. According to the conventional method, a server computer converts a content viewed by a user into print data that can be printed by the printer and transmits the converted data to the printer. The printer prints the received data.

Further, a recently developed server computing system, such as a cloud computing system or a Software as a Service (SaaS), can perform various kinds of processing in response to requests from client computers. The cloud computing system uses many computing resources to perform data conversion and data processing in a discrete fashion so that requests from many clients can be simultaneously processed.

SUMMARY OF THE INVENTION

According to an aspect of the present invention, a network system includes at least one server computer that is capable of communicating with a client computer. The network system includes a first processing unit configured to accept a request transmitted from the client computer and to register a job that processes the accepted request into a storage unit, wherein the first processing unit includes one or a plurality of processing units. The network system further includes a second processing unit configured to acquire the job from the storage unit asynchronously with the job being registered into the storage unit and to process the acquired job, wherein the second processing unit includes one or a plurality of processing units. The first processing unit is configured to transmit authentication information usable to acquire a processing result of the job corresponding to the request to the client computer without waiting for the second processing unit to complete processing of the job registered in the storage unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 1 illustrates an example configuration of a network printing system that can serve as a network system according to an exemplary embodiment of the present invention.

FIG. 6 illustrates an example of a queue message according to an exemplary embodiment of the present invention.

FIG. 8 illustrates an example of a service table according to an exemplary embodiment of the present invention.

FIG. 9 illustrates an example of a service sequence table according to an exemplary embodiment of the present invention.

FIG. 12 illustrates an example of a document data upload success screen according to an exemplary embodiment of the present invention.

FIG. 13 illustrates an example of an inquiry ID table according to an exemplary embodiment of the present invention.

FIG. 16 is a flowchart illustrating details of a user's print target document data registration operation according to an exemplary embodiment of the present invention.

FIG. 17 illustrates an example of a back-end processing status table that can be managed by a table storage service according to an exemplary embodiment of the present invention.

FIG. 18 illustrates an example of information (a setting file) that can define the total number of instances in a back-end processing unit operating on the server computer group.

FIG. 20 illustrates another example of the document data upload success screen according to an exemplary embodiment of the present invention.

DESCRIPTION OF THE EMBODIMENTS

Figure 2A:
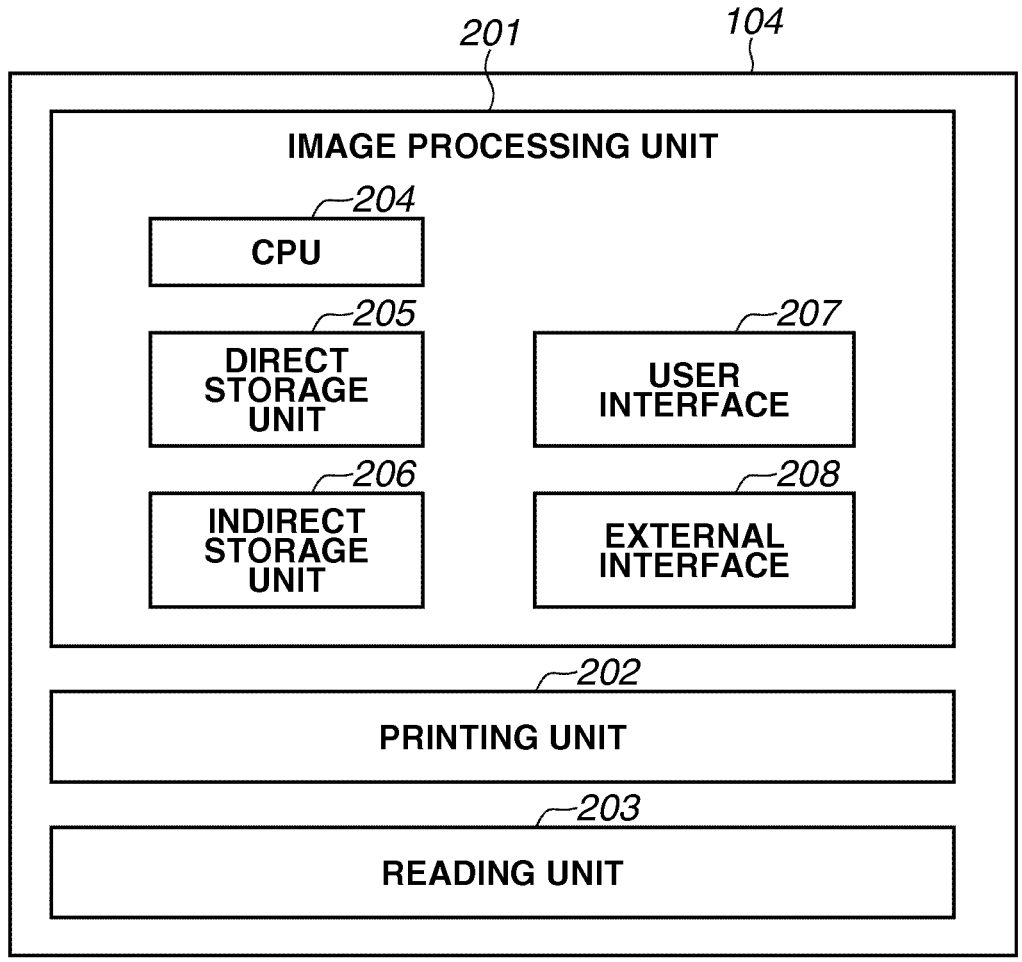
FIGS. 2A and 2B are block diagrams illustrating an example internal configuration of an image forming apparatus according to an exemplary embodiment of the present invention.

Various exemplary embodiments, features, and aspects of the invention will be described in detail below with reference to the drawings.

A recently developed network printing system enables a user of a client terminal to register a document into a server and cause a printing apparatus, which is different from the client terminal, to access the same server to acquire document data and print the acquired data. The cloud computing system is an advanced system that can execute, in a concentrated fashion, various kinds of processing to be performed by many network printing systems that are similar in configuration.

However, in an ordinary network printing system, the processing for registering a document into a server from a client terminal takes a significant time to complete. More specifically, the document registration processing generally includes upload processing to be performed by the client terminal to upload document data to the server, conversion processing to be performed by the server to convert the uploaded document data into print data, and storage processing to be performed by the server to store the print data into an arbitrary storage area of the server.

Then, the server returns a result of the above-described sequential processing to the client terminal. While waiting for the processing result to be returned, the user cannot start uploading a new document until authentication information, which is necessary to actually print an uploaded document by a printing apparatus, is acquired as a result of the sequential processing.

In the cloud computing system, it is general that the above-described processing that requires a significant execution time to complete is executed as back-end processing to be executed in the server asynchronously with a user's request, not synchronization processing such as a web application.

An exemplary embodiment of the present invention can improve usability of the network printing system by enabling each client computer to be disconnected in advance from a network system without waiting for completion of processing that is currently performed in response to a request from a client computer.

FIG. 1 illustrates an example configuration of a network printing system that can serve as a network system according to an exemplary embodiment of the present invention. As illustrated in FIG. 1, the network printing system according to the present exemplary embodiment includes a plurality of functional units constituting the network printing system, which are connected via a network 100.

More specifically, the network printing system includes a server computer group 102, a document server 103, an image forming apparatus 104, a client computer 105, a document extraction server 107, a document conversion server 108, and a print server 109.

The network 100 is a communication circuit enabling the above-described functional units to transmit and receive information. The Internet 101 is a communication circuit enabling the above-described functional units to transmit and receive information beyond the firewall. The network 100 to which the image forming apparatus 104 and the client computer 105 belong can communicate with the network 100 to which the server computer group 102 belongs via the Internet 101 beyond the firewall. Each of the network 100 and the Internet 101 is a communication circuit network, for example, supporting the TCP/IP protocol and can be a wired network or a wireless network.

In FIG. 1, the server computer group 102 includes at least one server computer. The document server 103, the document extraction server 107, the document conversion server 108, and the print server 109, which constitute the network printing system, may not be physically independent from the server computer group 102.

These servers may be physically present on the same computer. The server computer group 102 can use computer resources, such as the document server 103, the document extraction server 107, the document conversion server 108, and the print server 109. The server computer group 102 can execute various kinds of processing with reference to these computer resources. The computer resources that can be used by the server computer group 102 are not limited to only the document server 103, the image forming apparatus 104, the document extraction server 107, the document conversion server 108, and the print server 109 and may include any other functional servers.

Figure 2B:
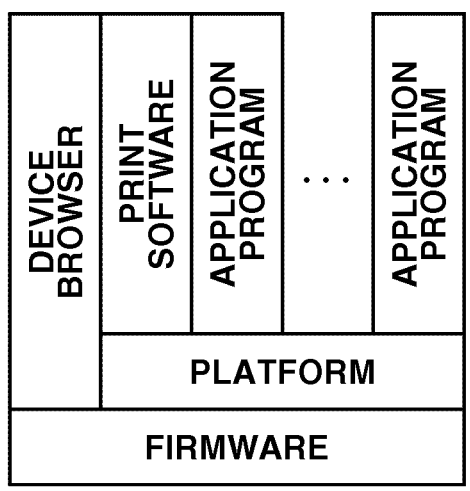

An internal configuration of each functional unit that constitutes the network printing system illustrated in FIG. 1 is described below in more detail. FIGS. 2A and 2B are block diagrams illustrating an example of the internal configuration of the image forming apparatus 104. As illustrated in FIG. 2A, the image forming apparatus 104 includes an image processing unit 201, a printing unit 202, and a reading unit 203. The image processing unit 201 includes a central processing unit (CPU) 204, a direct storage unit 205, an indirect storage unit 206, a user interface 207, and an external interface 208.

The CPU 204 is operable as a unit configured to execute predetermined programs and instruct the image forming apparatus 104 to perform various operations.

The direct storage unit 205 is operable as a work memory when the CPU 204 executes the programs. Each program to be executed by the CPU 204 is loaded into the direct storage unit 205. The direct storage unit 205 can be realized by a random access memory (RAM).

The indirect storage unit 206 stores various programs including application programs and a platform program described below. Each program stored in the indirect storage unit 206 can be moved to the direct storage unit 205 when the CPU 204 executes the program. The indirect storage unit 206 is, for example, a solid state drive (SSD) or a hard disc drive (HDD). The CPU 204 can be a multi-processor.

Hereinafter, the platform is described below in more detail with reference to FIG. 2B. Realization of the platform enables users to develop a new application to be executed by the image forming apparatus 104 and customize an operation screen of the image forming apparatus 104.

An example method for realizing the platform is described below. The CPU 204 moves the platform program from the indirect storage unit 206 to the direct storage unit 205. If the above-described platform program moving processing is completed, the CPU 204 can immediately execute the platform program. In an exemplary embodiment of the present invention, the state where the CPU 204 executes the platform program is referred to as launching of the platform.

The platform starts operating on the firmware of the image forming apparatus 104 as illustrated in FIG. 2B. To realize the firmware, the CPU 204 executes the firmware program loaded into the direct storage unit 205 from the indirect storage unit 206.

The platform program provides an environment that is required to execute an object-oriented application program. An example method for executing an application program on the platform is described below in more detail.

In an exemplary embodiment of the present invention, application programs operable on the platform include print software capable of accepting a print request. The print software can receive print data from a device connected via a network, for example, using a communication protocol, such as Hyper Text Transfer Protocol (HTTP).

The print software can transmit received print data to the firmware. The firmware starts print data processing on the received print data. If the print data is already printable, the firmware does not perform the print data processing. As described above, controlling the image forming apparatus 104 can be realized by the application program (print software) executed on the platform.

An example method for executing an application program is described below. When the platform is launched, the platform moves a stored application program from the indirect storage unit 206 to the direct storage unit 205. If the above-described application program moving processing is completed, the platform can immediately execute the application program.

Subsequently, the platform executes the application program. The function of the platform that can be provided by executing an application program, as described above, is referred to as a platform application according to an exemplary embodiment of the present invention. Further, the platform can perform a part of each processing of the flowchart described in an exemplary embodiment of the present invention.

Further, a device browser is operating on the firmware of the image forming apparatus 104. The device browser is functionally operable to enable users to view data and information stored in a device accessible via the network 100. To realize the device browser, the CPU 204 executes the device browser program loaded into the direct storage unit 205 from the indirect storage unit 206.

The user interface 207 is operable as a unit configured to accept a user's processing request. For example, when a user inputs an instruction via a keyboard or a mouse, the user interface 207 can accept a signal representing the entered instruction.

The external interface 208 is functionally operable as a unit configured to receive data from an external device and transmit data to an external device. The external device is, for example, an external storage device (e.g., an external HDD or an external USB memory) or an independent apparatus (e.g., a host computer or an image forming apparatus) connected via a network. The image forming apparatus 104 can communicate with the client computer 105 via the network 100 and can communicate with the server computer group 102 via the Internet 101.

Figure 3:
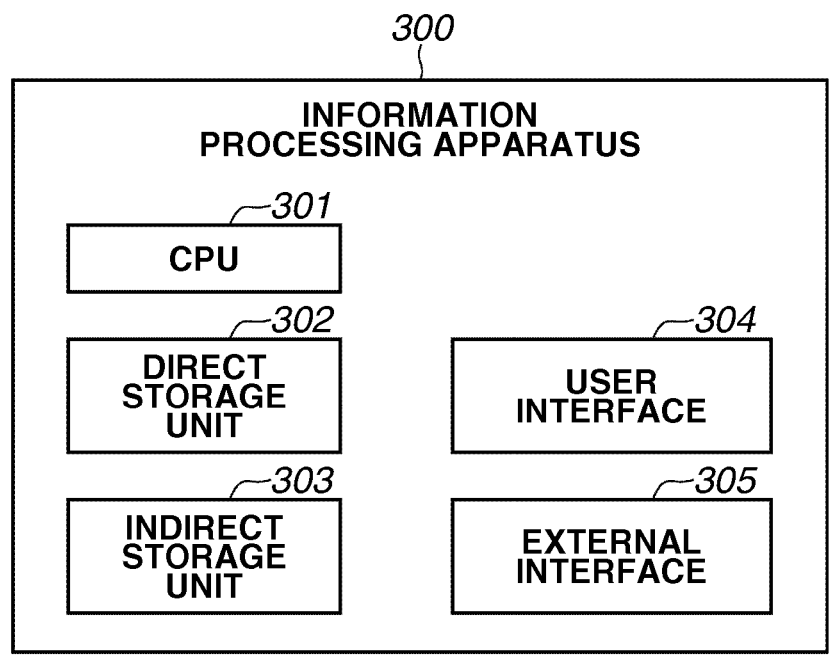
FIG. 3 is a block diagram illustrating an example internal configuration of an information processing apparatus according to an exemplary embodiment of the present invention.

Next, an internal configuration of an information processing apparatus, which can realize the server computer group 102, the document server 103, and the client computer 105, is described below with reference to FIG. 3. FIG. 3 is a block diagram illustrating an example of the internal configuration of the information processing apparatus 300.

The information processing apparatus 300 illustrated in FIG. 3 can realize the server computer group 102, the document server 103, and the client computer 105. The information processing apparatus 300 includes a user interface 304, a CPU 301, a direct storage unit 302, an indirect storage unit 303, and an external interface 305.

The user interface 304 is operable as a unit configured to accept a user's processing request. For example, when a user inputs an instruction via a keyboard or a mouse, the user interface 304 can accept a signal representing the input instruction The CPU 301 is operable as a unit configured to execute predetermined programs and instruct the information processing apparatus 300 to perform various operations. The direct storage unit 302 is operable as a work memory when the CPU 301 executes programs. Each program to be executed by the CPU 301 is loaded into the direct storage unit 302. The direct storage unit 302 can be realized by a RAM.

The indirect storage unit 303 stores various programs including application programs and an operating system (OS). Each program stored in the indirect storage unit 303 can be moved to the direct storage unit 302 when the CPU 301 executes the program. The indirect storage unit 303 is, for example, a read only memory (ROM) or a HDD. The external interface 305 is connected to the network 100 and can communicate with other device connected to the network 100.

Figure 4:
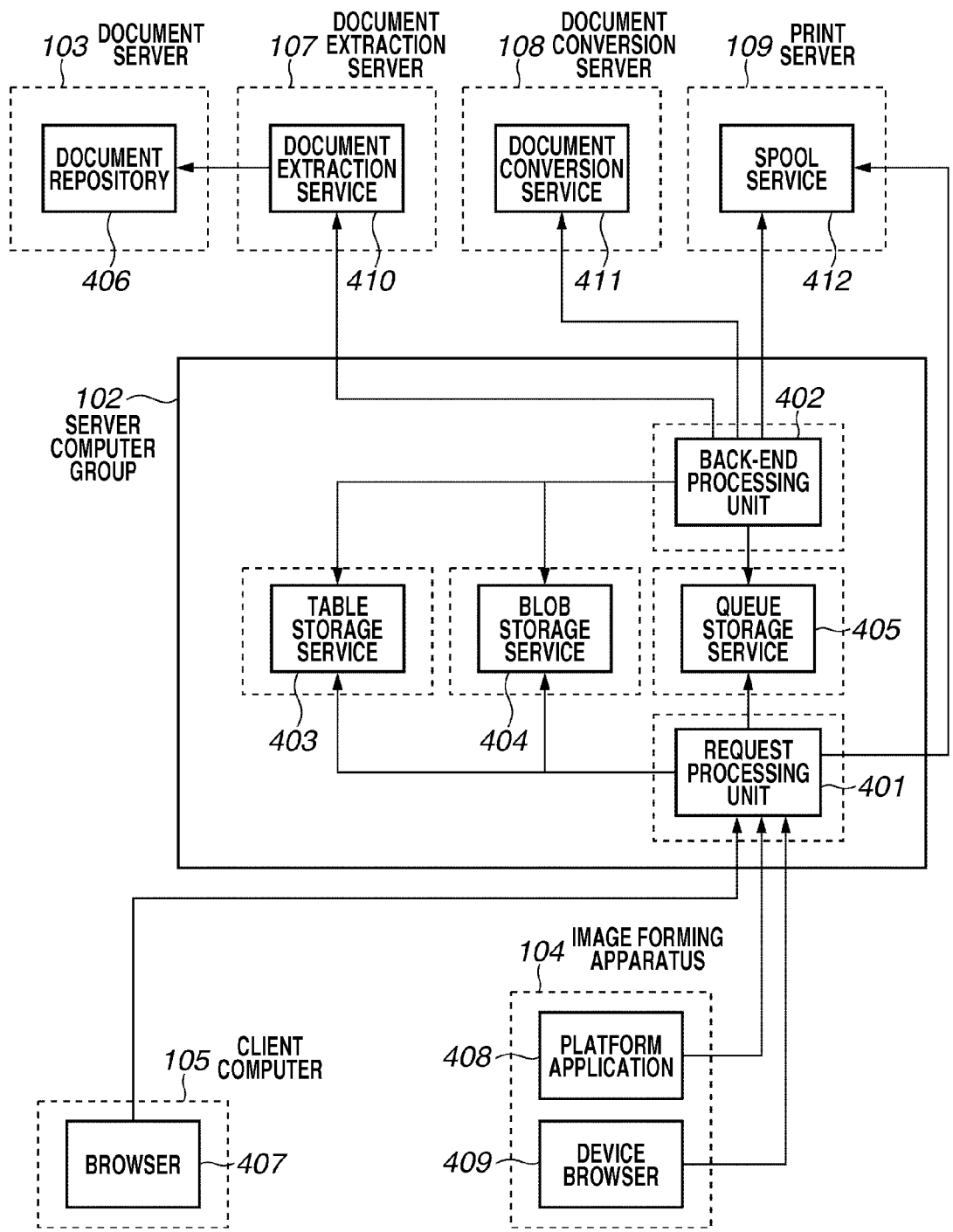
FIG. 4 is a block diagram illustrating a functional configuration of constituent components that constitute the network printing system according to an exemplary embodiment of the present invention.

Next, functions of the constituent components that constitute the network printing system according to the present exemplary embodiment are described below in more detail with reference to FIG. 4. FIG. 4 is a block diagram illustrating a functional configuration of the constituent components that constitute the network printing system.

First, a functional configuration of the server computer group 102 is described below. The server computer group 102 includes a request processing unit 401 (first processing unit), a back-end processing unit 402 (second processing unit), a table storage service 403, a blob storage service 404, and a queue storage service 405.

The server computer group 102 according to the present exemplary embodiment includes at least one server computer having the request processing unit 401, at least one server computer having the back-end processing unit 402, and at least one server computer functionally operable as the table storage service 403, the blob storage service 404, and the queue storage service 405.

The request processing unit 401 is functionally operable to accept a processing request transmitted from the client computer 105 or the image forming apparatus 104. The back-end processing unit 402 is functionally operable to perform processing according to a processing program in response to a processing request. More specifically, the back-end processing unit 402 loads the processing program into a memory of the server computer that executes the back-end processing unit 402 and performs processing that responds to the processing request.

To realize the request processing unit 401, the CPU 301 executes a request reception program loaded into the direct storage unit 302 from the indirect storage unit 303 of the information processing apparatus (see FIG. 3) that realizes the server computer group 102. Further, to realize the back-end processing unit 402, the CPU 301 executes a back-end processing program loaded into the direct storage unit 302 from the indirect storage unit 303 of the information processing apparatus (see FIG. 3) that realizes the server computer group 102.

The table storage service 403 is functionally operable to store status data, such as status of processing executed by the back-end processing unit 402. To realize the table storage service 403, the CPU 301 executes a table storage service program loaded into the direct storage unit 302 from the indirect storage unit 303 of the information processing apparatus that realizes the server computer group 102. Further, the data stored by the table storage service 403 can be stored in the indirect storage unit 303.

The blob storage service 404 is functionally operable to store various data including execution results of the processing performed by the back-end processing unit 402. To realize the blob storage service 404, the CPU 301 executes a blob storage service program loaded into the direct storage unit 302 from the indirect storage unit 303 of the information processing apparatus that realizes the server computer group 102. Further, the data stored by the blob storage service 404 can be stored in the indirect storage unit 303.

The queue storage service 405 is functionally operable in the following manner. As a first function, the queue storage service 405 enables the request processing unit 401 and the back-end processing unit 402 to perform asynchronous data communication. As a second function, the queue storage service 405 brings a queue message added to a queue into an invisible state or into a visible state.

The first function is described below in more detail. The request processing unit 401 and the back-end processing unit 402 communicate with each other using the following method. First, when the request processing unit 401 receives a processing request from a user, the request processing unit 401 creates a ticket according to the user's processing request. The created ticket is referred to as a queue message. The request processing unit 401 stores the queue message in a queue provided by the queue storage service 405.

The back-end processing unit 402 acquires the queue message from the queue of the queue storage service 405. After the back-end processing unit 402 acquires the queue message, the back-end processing unit 402 processes the processing request referring to the acquired queue message. Thus, processing of the user's processing request is completed.

As described above, using the queue storage service 405 enables to realize asynchronous communications to be performed between the request processing unit 401 and the back-end processing unit 402. The first function is further described in more detail and the second function is described below.

To realize the queue storage service 405, the CPU 301 executes a queue storage service program loaded into the direct storage unit 302 from the indirect storage unit 303 of the information processing apparatus that realizes the server computer group 102. Further, the data (message) stored by the queue storage service 405 can be stored in the indirect storage unit 303. The above-described function of the server computer group 102 is described below in more detail.

The document server 103 has the following functions. The document server 103 is functionally operable as a document repository 406. The document repository 406 can be realized by the indirect storage unit 303 of the information processing apparatus (see FIG. 3) that realizes the document server 103. For example, the document repository 406 stores contents of a print instruction received from a user via the client computer 105 or the image forming apparatus 104. The contents stored in the document repository 406 include the following contents in addition to preliminarily stored contents.

For example, when a user creates a content using an application of the server computer group 102 via a browser 407 described below, the created content is stored in the document repository 406. Thus, even when the content is created using the application of the server computer group 102, it is easily feasible to print the created content without installing any application on the client computer 105.

The applications of the above-described server computer group 102 include a document creation application, an image forming application, a form management application, and other various applications. These applications are stored in the indirect storage unit 303 illustrated in FIG. 3. If execution of each application is instructed, the instructed application is loaded into the direct storage unit 302 and executed by the CPU 301.

Next, the image forming apparatus 104 is described below in more detail. The image forming apparatus 104 is functionally operable as a device browser 409 and a platform application 408. The device browser 409 is functionally operable to enable users to view data and information stored in a device accessible via the network 100. Further, the image forming apparatus 104 enables users to instruct printing of the content using the device browser 409. The device browser 409 is, for example, a web browser.

The platform application 408 is functionally operable to provide various services. The platform application 408 can be realized by an application program that operates on the platform. In an exemplary embodiment of the present invention, the platform application 408 provides a print software service.

As described above, the print software service can transmit received print data to the firmware. Further, the print software service can confirm whether the request processing unit 401 has completed the generation of print data. In this case, the print software service can confirm the generation based on a job ID created by the request processing unit 401.

Next, the client computer 105 is described below in more detail. The client computer 105 is functionally operable as the browser 407. The browser 407 is functionally operable to enable users to view data and information stored in a device accessible via the network 100. To realize the browser 407, the CPU 301 executes a browser program loaded into the direct storage unit 302 from the indirect storage unit 303 of the information processing apparatus that realizes the client computer 105. The browser 407 is, for example, a web browser.

The document extraction server 107 has the following functions. The document extraction server 107 is functionally operable as a document extraction service 410. The document extraction service 410 is recorded as a program in the indirect storage unit 303 of the information processing apparatus (see FIG. 3) that realizes the document extraction server 107 and can be loaded into the direct storage unit 302 when the program is executed by the CPU 301.

The document extraction service 410 is functionally operable to access the document server 103 according to a document extraction instruction received via the external interface 305 and acquire the content stored in the document repository 406.

The document conversion server 108 has the following functions. The document conversion server 108 is functionally operable as a document conversion service 411. The document conversion service 411 is recorded as a program in the indirect storage unit 303 of the information processing apparatus that realizes the document conversion server 108 and can be loaded into the direct storage unit 302 when the program is executed by the CPU 301. The document conversion service 411 can convert the format of instructed data into a predetermined data format according to a document conversion instruction received via the external interface 305.

The print server 109 has the following functions. The print server 109 is functionally operable as a spool service 412. The spool service 412 is recorded as a program in the indirect storage unit 303 of the information processing apparatus that realizes the print server 109 and can be loaded into the direct storage unit 302 when the program is executed by the CPU 301.

The spool service 412 can generate attribute information (e.g., print priority, tint information, etc.), which is required to print instructed data according to an instruction received via the external interface 305. The network printing system according to an exemplary embodiment can operate in the above-described manner.

Figure 5:
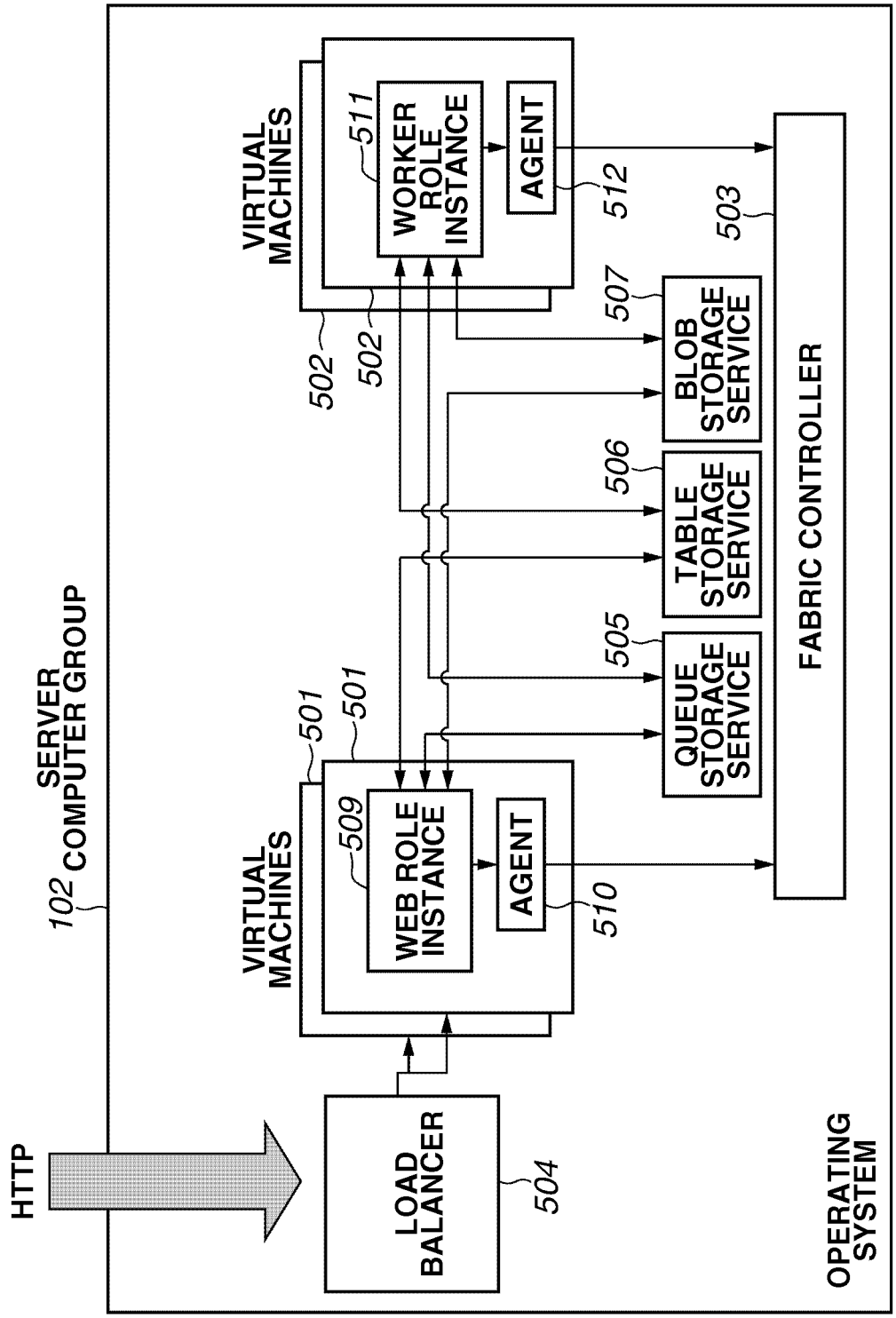
FIG. 5 illustrates various functions of a server computer group according to an exemplary embodiment of the present invention.

Next, a platform system of the server computer group 102 is described below in more detail with reference to FIG. 5. FIG. 5 illustrates various functions of the server computer group 102. In FIG. 5, a physical hardware resource provided in the server computer group 102 can be used as the platform of the server computer group 102. A platform user of the server computer group 102 can use a physical hardware resource provided in the server computer group 102 as a computing resource.

The platform system (i.e., operating system) of the server computer group 102 is functionally operable as virtual machines 501 and 502, a fabric controller 503, a load balancer 504, a queue storage service 505, a table storage service 506, or a blob storage service 507.

The platform system operating on the server computer group 102 includes a plurality of virtual machines 501 and 502. The virtual machine can be obtained by dividing the server computer group 102 (a physical computer group) into logical computers using a virtualization technique. Each logical computer includes an independent operating system to perform various operations. Each logical computer is referred to as an instance. In an exemplary embodiment of the present invention, an instance is operable on a single server computer of the server computer group 102.

The virtual machine 501 includes a request processing unit (web role instance) 509 and a request processing unit agent (agent) 510. The request processing unit 509 corresponds to the request processing unit 401 illustrated in FIG. 4. The request processing unit 509 can receive a user's processing request via the load balancer 504. Further, the request processing unit 509 can transmit a processing request to the back-end processing unit 511 via the queue storage service 505.

To assure higher availability of the request processing unit 509, each request transmitted from an external network (using the HTTP communication) is received via the load balancer 504, which is located outside of the virtual machine 501. The load balancer 504 can manage all requests transmitted from external networks in a unified fashion and can selectively transfer respective requests to a plurality of virtual machines that are equivalent in request processing capability.

The request processing unit agent 510 collects various kinds of information, such as usage status of the virtual machine 501, operational state of the request processing unit 509, resource usage status of the virtual machine 501, and errors occurring in the request processing unit 509. The request processing unit agent 510 periodically transmits the collected information to the fabric controller 503.

The fabric controller 503 manages the instances of the request processing unit 509 and the back-end processing unit 511. Therefore, the fabric controller 503 can assure expandability and availability of each instance. For example, if a specific instance stops its operation due to failure of a server in the request processing unit 509 or in the back-end processing unit 511, the fabric controller 503 cannot receive a periodic notice from the request processing unit agent 510 or from a back-end processing unit agent 512.

If the fabric controller 503 cannot receive any periodic notice, the fabric controller 503 outputs an instruction to a virtual machine to transfer the processing to a new instance. As a result, the number of instances that are currently executing the processing can be maintained at a constant value. The fabric controller 503 plays a certain role in preventing the processing from being delayed.

The virtual machine 502 includes the back-end processing unit (worker role instance) 511 and the back-end processing unit agent (agent) 512. The back-end processing unit 511 corresponds to the back-end processing unit 402 illustrated in FIG. 4.

The back-end processing unit 511 can receive a processing request from the request processing unit 509 via the queue storage service 505. The back-end processing unit 511 can execute the processing request received from the request processing unit 509 via the queue storage service 505.

Further, the back-end processing unit 511 has scale-out capability, according to which the virtual machine 502 can expand in such a way as to increase the number of instances provided in the back-end processing unit 511. If the number of the instances of the back-end processing unit 511 increases, the data processing amount per back-end processing unit decreases. Thus, the back-end processing unit 511 can quickly return a processing result as a response to the user's processing request.

The queue storage service 505 can provide a service that enables the request processing unit 509 and the back-end processing unit 511 to perform asynchronous data communication. The queue storage service 505 corresponds to the queue storage service 405 illustrated in FIG. 4. The request processing unit 509 and the back-end processing unit 511 send various instructions to the queue storage service 505 to perform asynchronous data communications, as described below in more detail.

The instruction transmitted from the request processing unit 509 to the queue storage service 505 is a queue message addition instruction. The instruction transmitted from the back-end processing unit 511 to the queue storage service 505 is a queue message acquisition instruction or a queue message deletion instruction.

A sequential operation of the data communications asynchronously performed between the request processing unit 509 and the back-end processing unit 511 is described below. The request processing unit 509 creates a queue message according to a user's processing request and transmits an addition instruction, which instructs to add the created queue message to the queue, to the queue storage service 505. When the queue storage service 505 receives the addition instruction, the queue storage service 505 adds the queue message to the queue.

The back-end processing unit 511 transmits an acquisition instruction, which instructs to acquire the queue message, to the queue storage service 505. When the queue storage service 405 receives the acquisition instruction, the queue storage service 405 transmits the queue message, a message ID uniquely allocated to each queue message, and a job ID, as a response to the acquisition instruction, to the back-end processing unit 511.

The message ID is unique information allocated to each queue message to identify the queue message. The message ID can be referred to when the back-end processing unit 511 instructs to delete the queue message. The job ID is identification information identifying a job, which uniquely determines the content to be actually processed.

When the back-end processing unit 511 completes the processing request, the back-end processing unit 511 transmits a queue message deletion instruction corresponding to the message ID to the queue storage service 505. When the queue storage service 505 receives the deletion instruction, the queue storage service 505 deletes the queue message corresponding to the message ID instructed by the back-end processing unit 511 from the queue. Thus, the present exemplary embodiment can prevent the back-end processing unit 511 other than the back-end processing unit 511 having output the deletion instruction from processing the same queue message.

Further, the queue storage service 505 can bring the queue message added to the queue into an invisible state or into a visible state. If the queue message added to the queue is brought into the invisible state, the queue storage service 505 does not send any queue message to the back-end processing unit 511 even when acquisition of the queue message is requested by the back-end processing unit 511. If the back-end processing unit 511 acquires a queue message from a queue, the queue storage service 505 brings the acquired queue message into the invisible state.

If the queue message added to the queue is brought into the visible state, the queue storage service 505 transmits the queue message to the back-end processing unit 511 when acquisition of the queue message is requested by the back-end processing unit 511.

A queue message, which is acquired by the back-end processing unit 511 and kept in the invisible state, can be brought into the visible state by the queue storage service 405 if no processing result is returned for a predetermined time from the back-end processing unit 511 that is currently executing the processing. Therefore, even when the back-end processing unit 511 cannot continue the processing due to abnormal termination, the processing can be automatically retried.

The table storage service 506 provides a storage that can be used to store data. The data stored in the table storage service 506 has a simple format represented by a combination of entity and type information properties. The table storage service 506 corresponds to the table storage service 403 illustrated in FIG. 4.

The blob storage service 507 provides a storage that can be used to store data. Functions provided by the blob storage service 507 include the capability of storing an assembly of binary data. The blob storage service 507 corresponds to the blob storage service 404 illustrated in FIG. 4.

Next, the queue message according to an exemplary embodiment of the present invention is described below with reference to FIG. 6. FIG. 6 illustrates an example of the queue message according to the present exemplary embodiment. The queue message includes a description relating to the content of processing that the request processing unit 509 requests the back-end processing unit 511.

The queue message illustrated in FIG. 6 includes a request area 601 that indicates a location of a queue storage service to which the queue message is added. The queue message further includes a header area 602 that can transmit authentication information usable to access the queue storage service.

Next, a message data content portion of the queue message is described below. The message data content portion is determined according to a user's processing request. The queue message illustrated in FIG. 6 further includes a <MessgaText> area 603 that indicates a job ID. According to the example illustrated in FIG. 6, the job ID is "pk01|job01." The job ID is unique information created according to a user's processing request.

Next, a job management table according to an exemplary embodiment of the present invention is described below with reference to FIG. 7. The job management table illustrated in FIG. 7 can be used to manage sequential processing to be executed by the back-end processing unit 511 as a job and store related data including job content and processing status. The table storage service 506 stores the job management table.

Figure 7:
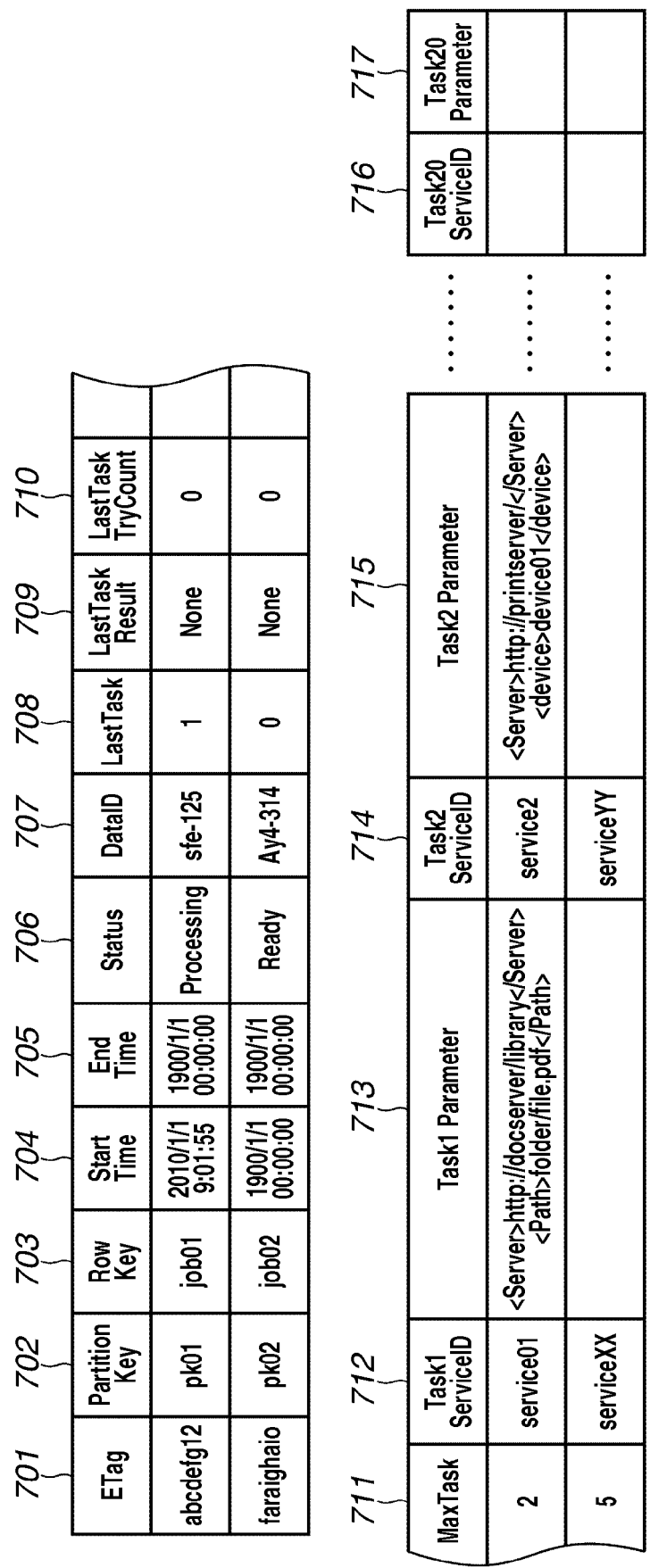
FIG. 7 illustrates an example of a job management table according to an exemplary embodiment of the present invention.

FIG. 7 illustrates an example of the job management table stored in the table storage service 506. The job management table illustrated in FIG. 7 includes an ETag field 701 that stores a value automatically set by the table storage service 506. A unique value is written in the ETag field 701 when column data is updated.

When data acquired from the table is updated, if an updated value written in the ETag field 701 is different from the value written in the ETag field 701 in the acquisition of data, it is feasible to determine that the table is updated by other processing process.

The job management table further includes a Partition Key field 702 and a Row Key field 703, which store ID information capable of uniquely identifying a column of the table. The job management table can be used to manage the above-described two values as job ID information.

The job management table further includes a Start Time field 704 that stores registered job start date and time information and an End Time field 705 that stores registered job end date and time information. An initial value is stored in the Start Time field 704 before the job starts. Similarly, an initial value is stored in the End Time field 705 before the job terminates.

The job management table further includes a Status field 706 that stores status information of the entire job. The status of a job can be managed according to a processing status of the job and can be classified into any one of Ready (preparation completed), Processing (processing in progress), Success (success), and Failure (failure).

The job management table further includes a DataID field 707 that stores ID information of data associated with the job. When the blob storage service 507 stores data, ID information of the data is a unique value in the blob storage service 507.

The job management table further includes a LastTask field 708 that records a task number of the task whose execution is completed. In general, a job includes a plurality of tasks to be successively processed. For example, the first task is acquiring a file from a document server and the second task is inputting data into a print spooler service. The first task and the second task are a combination of tasks to be successively executed as a job. If the task acquiring the file from the document server is completed, "1" is recorded in the LastTask field 708. If none of the tasks is completed, "0" is recorded in the LastTask field 708.

The job management table further includes a LastTask Result field 709 that stores a processing result of a finally executed task. The processing result of each task can be managed and classified into any one of None (before-task-end state), Success (success), FailureRetry (retriable failure), and Failure (failure), which is a value to be returned as a processing result of the task.

The job management table further includes a LastTask TryCount field 710 that records information indicating the number of times of execution of the finally executed task. If the processing result of a task is FailureRetry (retriable failure), the task is executed repetitively. In this case, the number of times of re-execution of the task is recorded in the LastTask TryCount field 710.

If the numerical value stored in the LastTask TryCount field 710 becomes equal to or greater than a constant number of times, namely when the repetitive execution of the task cannot be successfully accomplished, the LastTask TryCount field 710 is used for the control for determining the task as an error.

The job management table further includes a MaxTask field 711 that records information indicating the number of tasks included in the job. In the present exemplary embodiment, the job can include tasks "1" to "20."

The job management table further includes a Task1 ServiceID field 712 to a Task20 Parameter field 717, which store information that can be used to manage information relating to each task included in the job.

The Task1 ServiceID field 712 stores ID information of a service that provides a task to be executed first. The Task1 Parameter field 713 stores a parameter to be sent to the task when the task 1 is executed. Similarly, the Task2 ServiceID field 714 and the Task2 Parameter field 715 store information (data ID and parameter) relating to a task to be executed next. Finally, the Task20 ServiceID field 716 and the Task20 Parameter field 717 store information (data ID and parameter) relating to a task to be executed last.

The job management table according to the present exemplary embodiment can store a total of twenty pieces of task information. In the present exemplary embodiment, the upper limit of the number of tasks is set to "20", although another value can be set as the upper limit of the number of tasks.

Next, a service table according to the present exemplary embodiment is described below with reference to FIG. 8. The service table can be used to manage each service that provides a task. The table storage service 506 stores the service table.

FIG. 8 illustrates an example of the service table stored in the table storage service 506. The service table illustrated in FIG. 8 includes an ETag field 801 that is similar to the ETag field 701 illustrated in FIG. 7. The service table further includes a Partition Key field 802 and a Row Key field 803, which store ID information capable of uniquely identifying a column of the table. In the service table, the Partition Key field 802 stores a fixed value (service) and the Row Key field 803 stores a value to be managed as a service ID.

The service table further includes a URI field 804 that stores URI information of a web service that provides a service. Accessing the web service identified by the URI information managed (stored) in the URI field 804 makes it feasible to utilize the service that can be provided.

In the present exemplary embodiment, the web service provides a service and manages URI information representing a provided address. Any other method can be used to provide a service. For example, I/F of REST can provide a service. An appropriate module, such as DLL, can provide a service.

The service table further includes a Type field 805 that stores service type information. The service type can be classified into any one of In (input service), Pipe (pipe service), and Out (output service). The input service is a service that performs processing for acquiring data from a document server and a service that can input data from an external system. The pipe service is a service that performs processing for converting document data into print data and is a service that can process data. The output service is a service that performs processing for inputting data into a print server and is a service that can output data to an external system.

The service table further includes an Attribute field 806 that stores attribute information of the service. The attribute information of the service is information independently defined and registered for each service. For example, according to a service that acquires data from a document server, URI information of the document server is stored as attribute information in the Attribute field 806. Further, according to a service that inputs a job to a print server, URI information of the print server is stored as attribute information in the Attribute field 806.

Next, a service sequence table according to an exemplary embodiment of the present invention is described below with reference to FIG. 9. The service sequence table can be used to manage a processing order of each service. The table storage service 506 stores the service sequence table.

FIG. 9 illustrates an example of the service sequence table stored in the table storage service 506. The service sequence table illustrated in FIG. 9 includes an Etag field 901 that is similar to the ETag field 701 (see FIG. 7). The service sequence table further includes a Partition Key field 902 and a Row Key field 903 that store ID information each identifying the column of the table. In the service sequence table, the Partition Key field 902 stores a fixed value (service) and the Row Key field 903 stores a value managed as a sequence ID.

The service sequence table further includes a MaxTask field 904 that defines the number of tasks included in the sequence. In the present exemplary embodiment, the sequence can include tasks "1" to "20." The service sequence table further includes a Task1 field (905) to a Task20 field (909) that can be used to manage information relating to a task included in the sequence.

The Task1 field (905) stores ID information of a service that provides a task to be executed first. Similarly, the Task2 field (906) stores information relating to a task to be executed next. The Task20 field (909) stores information relating to the task to be executed last.

The service sequence table according to the present exemplary embodiment can store a total of twenty pieces of task information. In the present exemplary embodiment, the upper limit of the number of tasks is set to "20", although another value can be set as the upper limit of the number of tasks.

The system according to the present exemplary embodiment has the above-described system configuration. Subsequently, a flow of overall processing that can be performed by the system according to the present exemplary embodiment is described below.

Figure 10B:
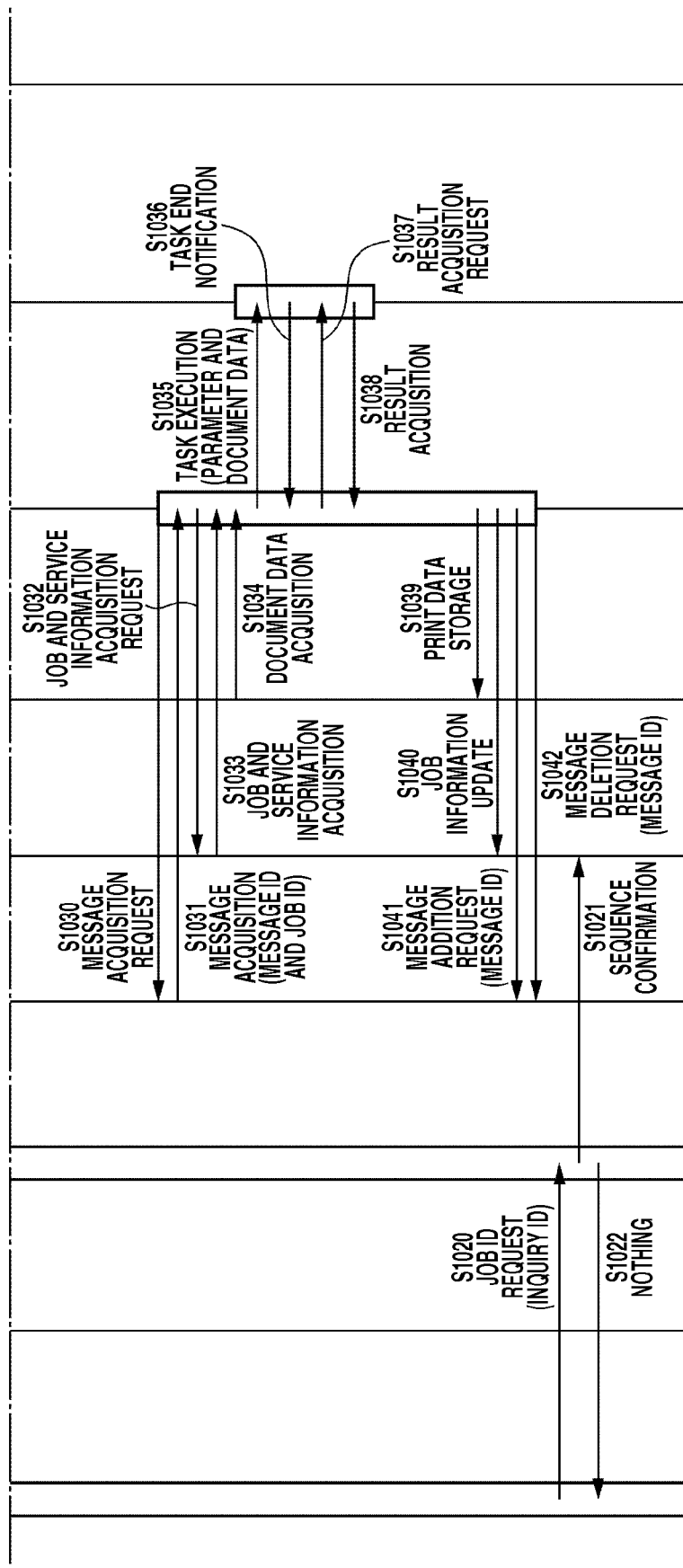
FIG. 10, composed of FIGS. 10A, 10B, and 10C, is a sequence diagram illustrating an overall processing flow of a general network printing system that can be realized by the network printing system according to an exemplary embodiment of the present invention.
Figure 10C:
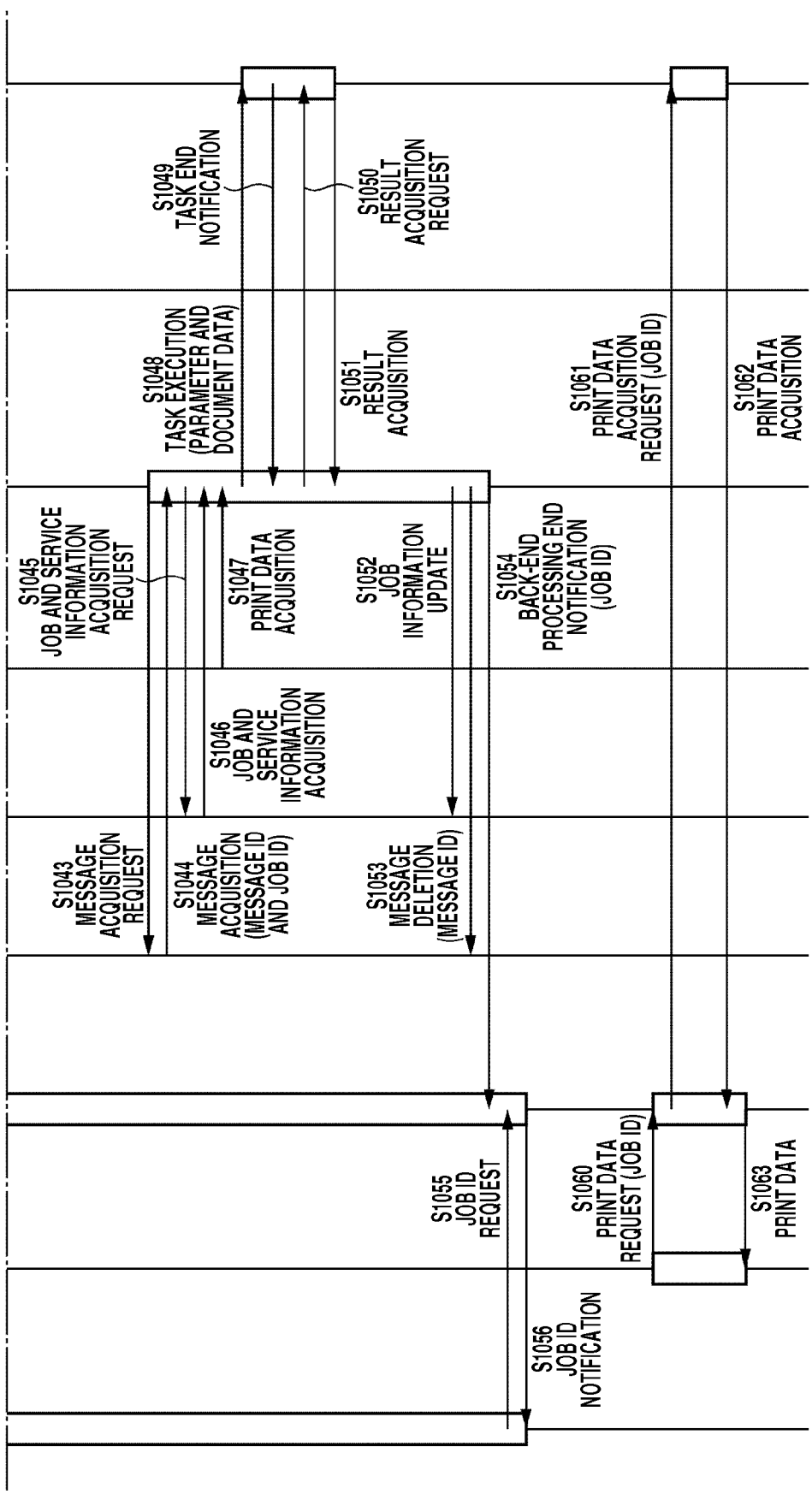

First, an overall processing flow of a general network printing system that can be realized by the network printing system having the system configuration illustrated in FIG. 1 to FIG. 9 is described below with reference to FIG. 10. FIG. 10 is a sequence diagram illustrating an example processing flow of the general network printing system that can be realized by the network printing system having the system configuration illustrated in FIG. 1 to FIG. 9.

An overall operation of the network printing system includes a print target document data registration operation, a print target document data conversion (to print data) operation, and a print data printing operation. Of the overall operation, each of the print target document data registration operation and the print data printing operation is an operation including a user operation. Further, the print target document data conversion (to print data) operation is an operation to be executed by the server computer group 102.

First, the print target document data registration operation is described. The print target document data registration operation includes sequential processing to be performed in response to a start instruction input by a user via the browser 407 of the client computer 105. In response to the user operation, the browser 407 starts communicating with a document data upload application that operates in the request processing unit 401 and requests acquisition of a document upload screen.

To realize the document data upload application, the CPU 301 executes the request reception program loaded into the direct storage unit 302 from the indirect storage unit 303 of the information processing apparatus (see FIG. 3) that realizes the server computer group 102.

Figure 11:
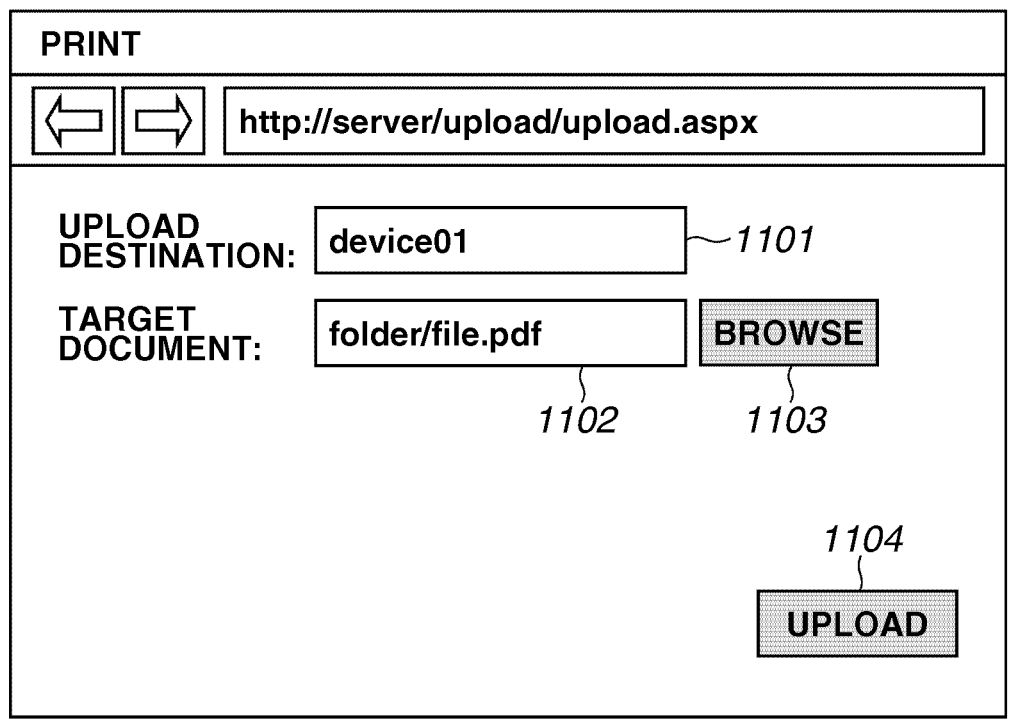
FIG. 11 illustrates an example of a document data upload screen according to an exemplary embodiment of the present invention.

If in step S1001 the request processing unit 401 receives a document upload screen acquisition request from the browser 407, the document data upload application generates a document data upload screen (see FIG. 11).

FIG. 11 illustrates an example of the document data upload screen that the browser 407 can display. The document data upload screen illustrated in FIG. 11 can be generated by the document data upload application when the request processing unit 401 receives the document upload screen acquisition request from the browser 407 in step S1001 illustrated in FIG. 10. In step S1002, the request processing unit 401 transmits the document data upload screen generated by the document data upload application to the browser 407.

The document data upload screen (see FIG. 11) includes an upload destination (upload location) field 1101 that displays information indicating a server that is executing the document data upload application with which a user is currently communicating. The document data upload screen further includes a target document field 1102 that displays information indicating a storage location in the client computer 105 that stores document data selected by the user.

When the user selects document data stored in the client computer 105, the user can press a browse button 1103 by operating the browser 407. If the user completes the selection of document data to be uploaded to the document data upload application, then the user can press an upload button 1104 via the browser 407 to start upload processing.

According to the example illustrated in FIG. 11, a document "folder/file.pdf" in the client computer 105 is the document to be uploaded to the document data upload application. Further, when the upload button 1104 is pressed by the user, the request processing unit 401 is instructed to execute a predetermined upload sequence. More specifically, the sequence ID stored in the Row Key field 903 of a row that corresponds to the upload sequence defined in the sequence table illustrated in FIG. 9 is allocated to the upload button 1104.

If in step S1003 the user presses the upload button 1104, the browser 407 transmits a document upload request to the request processing unit 401. Parameters of the document upload request include document data input in the target document field 1102 and the sequence ID.

In the present exemplary embodiment, the document upload request is a processing request including converting document data uploaded from the browser 407 to the network printing system into print data having a data format that can be printed by the image forming apparatus 104, registering the print data into a computer resource of the network printing system (the spool service 412 of the print server 109 in the present exemplary embodiment), and enabling the image forming apparatus 104 to acquire the registered print data.

In step S1004, the request processing unit 401 accepts the document upload request transmitted from the browser 407. Then, the request processing unit 401 stores the document data received as a parameter of the document upload request in the blob storage service 404. When the storage of the document data is completed, the blob storage service 404 returns storage location information (DataID) to the request processing unit 401.

Next, in step S1005, the request processing unit 401 transmits a sequence acquisition request to the table storage service 403 that stores the service sequence table (see FIG. 9). The transmitted sequence acquisition request includes, as a parameter, the sequence ID received from the browser 407 in step S1004.

In step S1006, the table storage service 403 acquires sequence data including the information in the RowKey field 903 that corresponds to the sequence ID received from the request processing unit 401 from the service sequence table (see FIG. 9) and transmits the acquired sequence data to the request processing unit 401.

In step S1007, the request processing unit 401 transmits a job addition request to the table storage service 403 that stores the job management table (see FIG. 7). Parameters to be transmitted together with the job addition request to the request processing unit 401 include the sequence data acquired in step S1006 and the storage location information (DataID) of the document data acquired in step S1004.

If the table storage service 403 receives the job addition request, then in step S1008, the table storage service 403 performs job generation and addition processing with reference to the parameters received together with the job addition request. The table storage service 403 adds a generated job to the job management table. Further, the table storage service 403 transmits a job ID (i.e., information in the Partition Key field 702 and the Row Key field 703) of the generated job to the request processing unit 401.

In step S1009, the request processing unit 401 transmits a message addition request to the queue storage service 405. A parameter to be transmitted together with the message addition request is the queue message (see FIG. 6) that includes the job ID (i.e., the information in the Partition Key field 702 and the Row Key field 703) received in step S1008.

In response to the queue message received from the request processing unit 401, the queue storage service 405 performs message addition processing. More specifically, the queue storage service 405 stores the queue message (i.e., parameter) received together with the message addition request in a queue of the queue storage service 405.

Further, when the request processing unit 401 receives the job ID from the table storage service 403, the document data upload application operating on the request processing unit 401 generates a document data upload success screen 1200 (see FIG. 12). In step S1010, the request processing unit 401 transmits the generated document data upload success screen 1200 (see FIG. 12) to the browser 407. The browser 407 receives the document data upload success screen (see FIG. 12) transmitted from the request processing unit 401 and displays the received screen.

FIG. 12 illustrates an example of the document data upload success screen that can be displayed by that the browser 407. The document data upload success screen 1200 illustrated in FIG. 12 includes an upload completion message area 1201 that displays a message indicating that upload of a document is successfully completed and conversion processing from document data to print data is currently in progress.

The document data upload success screen 1200 further includes an authentication information display area 1202 that displays authentication information (passcode), which is required when the user operates the device browser 409 to transmit a print data request to the request processing unit 401, as described below in step S1060.

In the present exemplary embodiment, the job ID transmitted from the table storage service 403 to the request processing unit 401 can be used as the authentication information (passcode). The received job ID can be displayed in the authentication information display area 1202 after print data conversion processing to be performed in steps S1030 to S1041 is completed. In this case, a message indicating that the print data conversion processing is currently executed (e.g., "registration in progress.") is displayed.

In step S1020, to confirm whether the print data conversion processing is completed, the user operates the browser 407 to press an update button 1203. An inquiry ID, which is generated together with the document data upload success screen 1200 by the request processing unit 401, is allocated to the update button 1203. The browser 407 transmits a job ID request that includes the inquiry ID, as a parameter, to the request processing unit 401.

The request processing unit 401 generates the above-described inquiry ID together with the document data upload success screen 1200. The request processing unit 401 transmits the generated inquiry ID and the job ID acquired in step S1008 to the table storage service 403.

Although not illustrated, in the above-described step S1010, the request processing unit 401 performs processing for transmitting the above-described inquiry ID and the job ID acquired in the above-described step S1008 to the table storage service 403 and requesting the table storage service 403 to store the inquiry ID in an inquiry ID table (see FIG. 13). The table storage service 403 stores the inquiry ID and the job ID acquired from the request processing unit 401 in the inquiry ID table (see FIG. 13) and manages the stored ID information.

FIG. 13 illustrates an example of the inquiry ID table that can be managed by the table storage service 403. The inquiry ID table illustrated in FIG. 13 includes an ETag field 1301 which stores a value automatically set by the table storage service 403, which is a unique value written when column data is updated.

The inquiry ID table further includes a PartitionKey field 1302 and a RowKey field 1303 that store ID information capable of uniquely identifying a column of the table. These values, stored in the PartitionKey field 1302 and the RowKey field 1303, are job ID values received by the request processing unit 401 in the above-described step S1008.

A management method similar to the job management table illustrated in FIG. 7 can be used to manage the above-described values as two values. The inquiry ID table further includes a RequestID field 1304 that stores inquiry ID information, which is a unique value generated by the request processing unit 401 together with the document data upload success screen.

In step S1021, the request processing unit 401 transmits a sequence confirmation request including, as a parameter, the inquiry ID transmitted together with the job ID request to the table storage service 403. The table storage service 403 acquires a job ID corresponding to the received inquiry ID from the inquiry ID table (see FIG. 13).

The table storage service 403 acquires job status information 706 that corresponds to the acquired job ID from the job management table (see FIG. 7) and transmits the acquired job status information 706 to the request processing unit 401.

The request processing unit 401, if the received status information 706 is the value "Success (success)", generates the document data upload success screen 1200 that displays the job ID in the authentication information display area 1202 and transmits the generated document data upload success screen 1200 to the browser 407. The processing performed by the request processing unit 401 in this case corresponds to step S1056. However, if the received status information 706 other than the value "Success", the request processing unit 401 does not notify the job ID. The processing performed by the request processing unit 401 in this case corresponds to step S1022.

To realize the job ID request processing (see steps S1020 and S1055), the browser 407 can use the HTML technique, such as Java® Script, to automatically send a job ID request to the request processing unit 401. The Java® Script 1204 illustrated in FIG. 12 is an example of the script that can be used when the document data upload success screen automatically requests a job ID.

Further, the browser 407 repetitively performs the above-described job ID request processing (see steps S1020 and S1055) until the request processing unit 401 transmits a job ID notification to the browser 407 (see step S1056) in response to a back-end processing end notification (see step S1054).

In step S1056, the browser 407 receives the job ID notification and displays the received job ID information, as authentication information (passcode), in the authentication information display area 1202 of the document data upload success screen 1200. Therefore, the user can confirm the job ID (i.e., authentication information (passcode)) displayed in the authentication information display area 1202 of the document data upload success screen 1200 via the browser 407. Through the above-described processing, the user can complete the print target document data registration operation.

Next, the print data printing operation is described below. In step S1060, the user operates the device browser 409 to cause the image forming apparatus 104 to print document data registered in the above-described print target document data registration operation. The device browser 409 communicates with a document data print application operating on the request processing unit 401.

Figure 14:
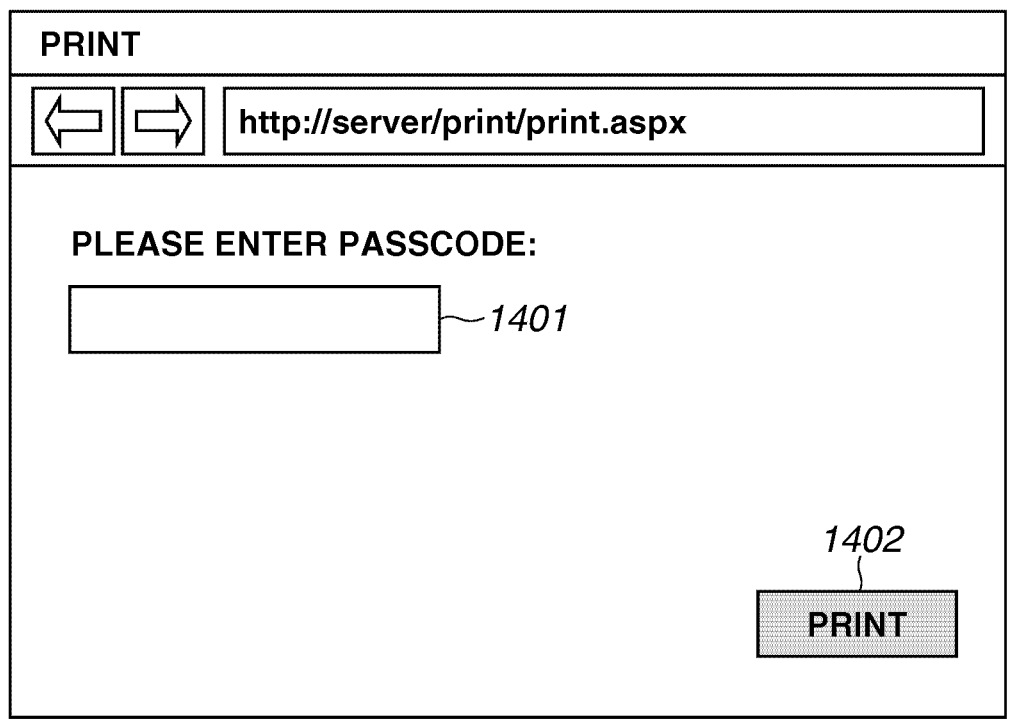
FIG. 14 illustrates an example of a document data print screen according to an exemplary embodiment of the present invention.

FIG. 14 illustrates an example of a document data print screen that can be displayed by the device browser 409. The document data print application generates the document data print screen illustrated in FIG. 14 when the request processing unit 401 receives a document data print screen acquisition request from the device browser 409 in step S1060.

The document data print screen illustrated in see FIG. 14 includes an authentication information input field 1401 into which the user can enter the job ID (authentication information (passcode)) acquired in step S1051. If the user presses a print button 1402 after entering the job ID in the authentication information input field 1401, the device browser 409 transmits the print data request to the request processing unit 401.

If the print button 1402 is pressed, the device browser 409 transmits the job ID entered in the authentication information input field 1401, as a parameter of the print data request, to the request processing unit 401.

In step S1061, the request processing unit 401 transmits a print data acquisition request together with the job ID received from the device browser 409, as a parameter, to the spool service 412.

In step S1062, the spool service 412 acquires print data corresponding to the job ID received from the request processing unit 401 from the blob storage service and transmits the acquired print data to the request processing unit 401.

In step S1063, the request processing unit 401 transmits the print data received from the spool service 412 to the device browser 409. The image forming apparatus 104, if the device browser 409 completes receiving the print data from the request processing unit 401, causes the firmware (see FIG. 2B) to start printing the received print data. The print data printing operation is completed through the above-described processing.

Next, the print target document data conversion (to print data) operation is described below. The print target document data conversion (to print data) operation includes a document conversion sequence of steps S1030 to S1042 and a spool registration sequence of steps S1043 to S1053 as illustrated in FIG. 10. The server computer group 102 executes the print target document data conversion (to print data) operation asynchronously with the operation performed by the user via the browser 407 and the device browser 409.

First, the document conversion sequence is described. In step S1030, the back-end processing unit 402 periodically transmits a message acquisition request to the queue storage service 405. If a message can be acquired from a queue, then in step S1031, the back-end processing unit 402 extracts a job ID from the <MessgaText> area 603 (see FIG. 6) of the acquired message.

In step S1032, the back-end processing unit 402 transmits a job and service information acquisition request to the table storage service 403 together with, as a parameter, the job ID acquired in step S1031. In step S1033, the table storage service 403 returns job and service information to the back-end processing unit 402 in response to the received acquisition request.

First, in the above-described processing, the back-end processing unit 402 acquires job information corresponding to the job ID from the job management table (see FIG. 7). Next, the back-end processing unit 402 acquires ID information of a service that provides a task to be executed next with reference to the acquired job information and acquires service information corresponding to the service ID from the service table (see FIG. 8).

Next, in step S1034, the back-end processing unit 402 acquires the document data stored in the above-described step S1004 from the blob storage service 404 with reference to the information in the DataID field 707 included in the above-described job and service information acquired in step S1033.

Next, in step S1035, the back-end processing unit 402 executes the task based on the above-described job information and service information acquired in step S1033. The task execution processing includes sending, as arguments, the job information and service information (in particular, the parameters managed in the job management table (see FIG. 7)) and the document data acquired in step S1034.

In the illustrated example of the sequence, the document conversion service 411 provides the task to be executed in step S1035. The document conversion service 411 executes processing for converting the document data into print data having a format that the image forming apparatus 104 can print. If the document conversion service 411 completes the print data conversion processing, then in step S1036, the document conversion service 411 transmits a task end notification to the back-end processing unit 402.

In step S1037, the back-end processing unit 402 transmits a result acquisition request to the document conversion service 411. In step S1038, the document conversion service 411 returns print data (conversion completed) and a task execution result to the back-end processing unit 402 in response to the received request.

In step S1039, the back-end processing unit 402 causes the blob storage service 404 to store the print data (conversion completed) acquired in the above-described step S1038. In step S1040, the back-end processing unit 402 causes the table storage service 403 to store the task execution result in the job management table (see FIG. 7). For example, the table storage service 403 changes the status information 706 of a corresponding task in the job management table (see FIG. 7), which can be identified based on the processed job ID, to the value "Success (success)."

The task for converting document data into print data is completed through the above-described processing. After the above-described sequential task processing is terminated, the back-end processing unit 402 performs queue message adding and deletion processing to execute the next task.

More specifically, in step S1041, the back-end processing unit 402 transmits a message addition request to the queue storage service 405 to add the message of the job ID processed in the above-described steps S1030 to S1040. Thus, a processing request of the task to be executed next (to be processed in steps S1043 to S1053) is completed.

Next, in step S1042, the back-end processing unit 402 transmits a message deletion request to the queue storage service 405 to delete the message processed in the above-described steps S1030 to S1040. Therefore, the message corresponding to the task processed in the above-described steps S1030 to S1040 can be deleted from the queue and re-execution of the processing due to timeout can be prevented.

Next, the spool registration sequence is described below. The following example is a flow of a task for adding print data to the print server 109. Processing to be performed in steps S1043 to S1046 is similar to the above-described processing performed in steps S1030 to S1033.

Next, in step S1047, the back-end processing unit 402 acquires the print data stored in the above-described step S1039, with reference to the job information and service information acquired in step S1046 (more specifically, with reference to the information in the DataID field 707), from the blob storage service 404.

Next, in step S1048, the back-end processing unit 402 executes the task based on the above-described job information and service information acquired in step S1046. The task execution processing includes sending, as arguments, the job information and service information (in particular, the parameters managed in the job management table (see FIG. 7)) and the document data acquired in step S1047.

In the illustrated example of the sequence, the spool service 412 provides the task to be executed in step S1047. The spool service 412 executed in step S1048 adds print data to the spool service 412 with reference to the given parameter and the print data.

In the present exemplary embodiment, the spool service 412 receives the job ID as a parameter and manages the print data in association with a value of the received job ID. If the spool service 412 completes the above-described processing, then in step S1049, the spool service 412 transmits a task end notification to the back-end processing unit 402.

In step S1050, the back-end processing unit 402 transmits a result acquisition request to the spool service 412. Then, in step S1051, the spool service 412 returns a task execution result to the back-end processing unit 402 in response to the received request.

In step S1052, the back-end processing unit 402 causes the table storage service 403 to store the task execution result in the job management table (see FIG. 7). For example, the table storage service 403 changes the status information 706 of a corresponding task in the job management table (see FIG. 7), which can be identified based on the processed job ID, to the value "Success (success)."

The task for adding print data to the spool service 412 is completed through the above-described processing. In the present exemplary embodiment, the job terminates upon adding the print data. Therefore, after the above-described sequential task processing is terminated, the back-end processing unit 402 performs queue message deletion processing.

In step S1053, the back-end processing unit 402 causes the queue storage service 405 to delete the above-described message processed in steps S1043 to S1052. Therefore, the message corresponding to the task processed in the above-described steps S1043 to S1052 can be deleted from the queue and the job terminates.

If the job terminates, then in step S1054, the back-end processing unit 402 transmits the job ID of the terminated job as a back-end processing end notification to the request processing unit 401. The request processing unit 401 completes preparation for returning the job ID in response to the job ID request from the browser 407 by transmitting the back-end processing end notification to the request processing unit 401.

More specifically, after the above-described back-end processing end notification is received (see step S1054), if the request processing unit 401 receives a job ID request from the browser 407 (see step S1055), the request processing unit 401 notifies the job ID to the browser 407 (see step S1056).

The above-described processing flow of the general network printing system can be realized by the network printing system having the system configuration illustrated in FIG. 1 to FIG. 9.

As illustrated in FIG. 10, a result responding to a user's request to print document data is not returned to the browser 407 that the user is operating until the spool service 412 completes the task of the print data in step S1048 after the upload of the document data is started in step S1003.

Further, the server computer group 102 asynchronously executes the document conversion sequence in steps S1030 to S1042 and the spool registration sequence in steps S1043 to S1053. Therefore, it is difficult to accurately estimate the time when the result responding to the user's request to print document data is returned.

The time when the result is returned is variable depending on the number of instances in the back-end processing unit 402 that are currently executing the task (or the number of messages stored in the queue storage service 405) and the total number of the instances in the back-end processing unit 402, at the time when the user requests printing of document data.

In other words, the processing of a print request may be immediately started or may be delayed for a long time depending on the number of instances in the back-end processing unit 402 that are currently executing the task (or the number of the stored messages) and the total number of the instances in the back-end processing unit 402 at the time when the user requests printing of document data.

Namely, the network printing system utilizing the cloud computing technique illustrated in FIG. 10 has the above-described problem.

A processing flow of a network printing system according to an exemplary embodiment of the present invention, which can solve the problem of the network printing system utilizing the cloud computing technique illustrated in FIG. 10, is described below.

Figure 15B:
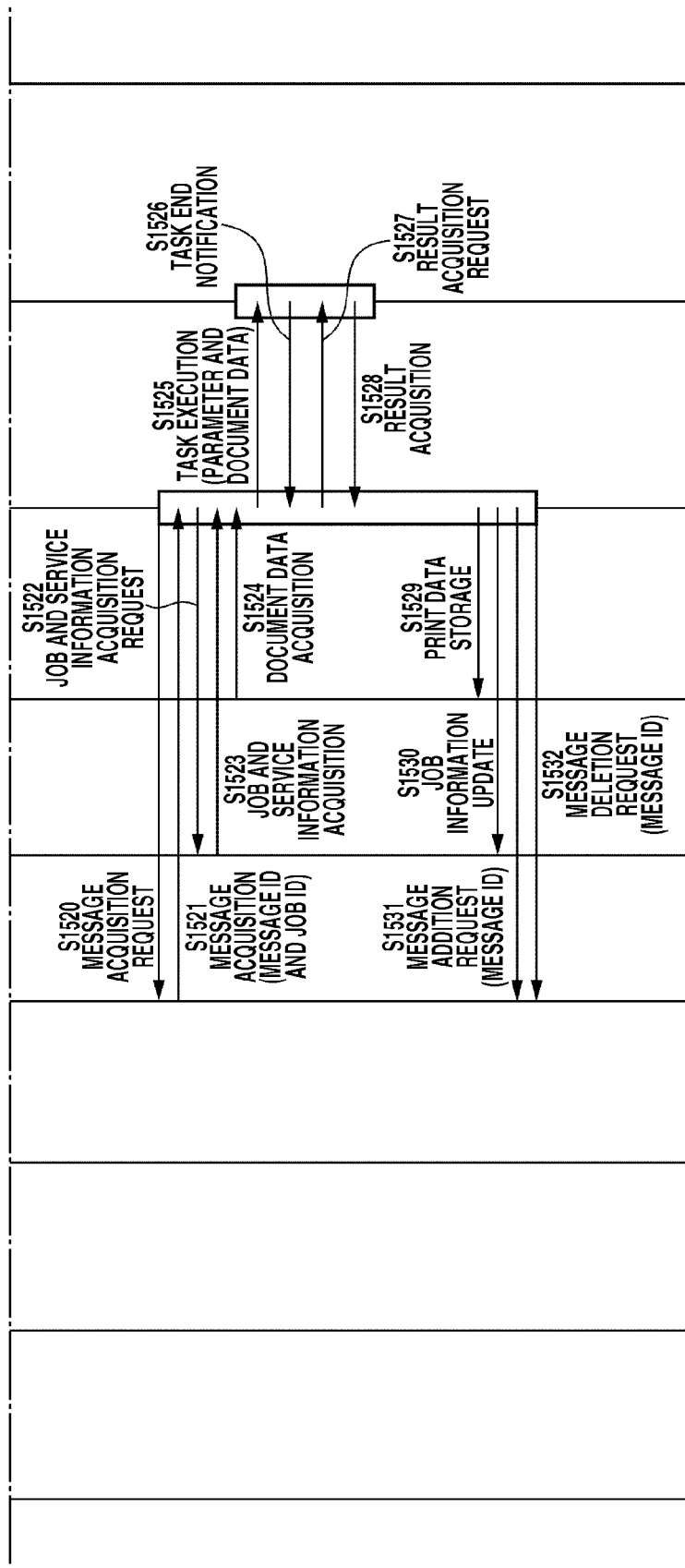
FIG. 15, composed of FIGS. 15A, 15B, and 15C, is a sequence diagram illustrating an overall processing flow of a network printing system according to an exemplary embodiment of the present invention.

FIG. 15 is a sequence diagram illustrating an example processing flow of the network printing system according to an exemplary embodiment of the present invention. The sequential processing illustrated in FIG. 15 prioritizes the operation by the back-end processing unit.

The sequence diagram illustrated in FIG. 15 is different from the sequence diagram illustrated in FIG. 10 in the content of the print target document data registration operation. Similar to the example illustrated in FIG. 10, a user operates the browser 407 of the client computer 105 to start the sequential processing. The browser 407 communicates with the document data upload application operating on the request processing unit 401.

In step S1501, the browser 407 transmits a document upload screen acquisition request to the request processing unit 401. If the request processing unit 401 receives the document upload screen acquisition request from the browser 407, then in step S1502, the request processing unit 401 acquires the total number of the instances in the back-end processing unit 402 that are operating on the server computer group 102.

Simultaneously, the request processing unit 401 acquires the number of instances of the back-end processing unit 402 that are currently executing the task with reference to a back-end processing status table (see FIG. 17) managed by the table storage service 403.

If the number of instances in the back-end processing unit 402 currently executing the task is smaller than the total number of instances in the back-end processing unit 402 operating on the server computer group 102, there is at least one instance of the back-end processing unit 402 that is not currently executing the task.

Therefore, the back-end processing unit 402 can immediately start processing a job corresponding to a newly transmitted request. The request processing unit 401 transmits a sequence ID corresponding to a predetermined sequence of the print target document data registration operation, together with a processing result, to the table storage service 403.

The sequence ID is determined beforehand so as to correspond to the above-described document upload screen acquisition request received in step S1501. Similar to the sequence illustrated in FIG. 10, the sequence ID is the value stored in the RowKey field 903 defined in the sequence table (see FIG. 9).

In step S1503, the request processing unit 401 transmits a sequence acquisition request to the table storage service 403 that stores the service sequence table (see FIG. 9). The sequence acquisition request transmitted by the request processing unit 401 includes, as a parameter, the sequence ID corresponding to the document upload screen acquisition request received in step S1501.

Then, in step S1504, the table storage service 403 transmits sequence data corresponding to the sequence ID received from the request processing unit 401 to the request processing unit 401.

In step S1505, the request processing unit 401 transmits a job addition request to the table storage service 403 that stores the job management table (see FIG. 7). The job addition request transmitted by the request processing unit 401 includes, as a parameter, the sequence data acquired in step S1504.

If the table storage service 403 receives the job addition request, then in step S1506, the table storage service 403 performs job generation and addition processing with reference to the parameter included in the received job addition request.

The table storage service 403 adds the generated job to the job management table. Further, the table storage service 403 transmits the job ID (i.e., the information stored in the Partition Key field 702 and the Row Key field 703) of the generated job to the request processing unit 401.

Then, if the request processing unit 401 receives the job ID from the table storage service 403, the document data upload application operating on the request processing unit 401 generates the document data upload screen (see FIG. 11).

In step S1507, the request processing unit 401 transmits the document data upload screen (see FIG. 11) generated by the document data upload application to the browser 407. At this moment, the sequence ID is not associated with the upload button 1104 of the document data upload screen (see FIG. 11).

If the user presses the upload button 1104 of the document data upload screen (see FIG. 11), then in step S1508, the browser 407 transmits a document upload request to the request processing unit 401. The document upload request transmitted by the browser 407 includes, as parameters, the document data entered in the target document field 1102 and the sequence ID.

In step S1509, the request processing unit 401 accepts the document upload request transmitted from the browser 407. Then, the request processing unit 401 causes the blob storage service 404 to store the received document data (i.e., the parameter) included in the document upload request. If the storage of the document data is completed, the blob storage service 404 returns storage location information (DataID) to the request processing unit 401.

Next, in step S1510, the request processing unit 401 causes the table storage service 403 to update job information corresponding to the job ID acquired in step S1506, which is stored in the job management table (see FIG. 7). The job information update processing includes transmitting, as a parameter, the storage location information (DataID) of the document data stored in the blob storage service 404 in step S1509.

In step S1511, the request processing unit 401 transmits a message addition request to the queue storage service 405. The message addition request transmitted by the request processing unit 401 includes, as a parameter, a queue message (see FIG. 6) including the job ID (i.e., the information stored in the Partition Key field 702 and the Row Key field 703) received in the above-described step S1506.

In response to the received request, the queue storage service 405 performs message addition processing. More specifically, the queue storage service 405 stores the received queue message (i.e., the parameter) of the message addition request in a queue of the queue storage service 405.

Then, the document data upload application operating on the request processing unit 401 generates a document data upload success screen (see FIG. 20) with reference to the above-described job ID. In step S1512, the request processing unit 401 transmits the generated document data upload success screen (see FIG. 20) to the browser 407. The browser 407 receives the document data upload success screen (see FIG. 20) transmitted from the request processing unit 401 and displays the received screen.

FIG. 20 illustrates an example of the document data upload success screen that can be displayed by the browser 407 in the sequence illustrated in FIG. 15. The document data upload success screen illustrated in FIG. 20 includes an upload completion message area 2001 that displays a message indicating that upload of a document is successfully completed.

The document data upload success screen further includes an authentication information display area 2002 that displays authentication information (passcode), which is required when the user operates the device browser 409 to transmit a print data request to the request processing unit 401, as described below in step S1550.

In the present exemplary embodiment, the job ID transmitted from the table storage service 403 to the request processing unit 401 in the above-described step S1506 can be used as the authentication information (passcode). The document data upload success screen illustrated in FIG. 20 is different from the document data upload success screen illustrated in FIG. 11 in that the job ID is preliminarily displayed in the authentication information display area 2002. Further, the document data upload success screen (see FIG. 20) does not include any update button.

In the present invention, the user can confirm the job ID (i.e., authentication information (passcode)) displayed in the authentication information display area 2002 of the document data upload success screen (see FIG. 20) via the browser 407. Through the above-described processing, the user can complete the print target document data registration operation.

The print target document data registration operation performed by the user according to an exemplary embodiment of the present invention is described below in more detail with reference to FIG. 16. FIG. 16 is a flowchart illustrating an example of the user's print target document data registration operation according to an exemplary embodiment of the present invention.

In step S1601, the browser 407 transmits a document upload screen acquisition request to the request processing unit 401. The processing to be performed in step S1601 corresponds to the processing performed in step S1501 in FIG. 15. In step S1602, the request processing unit 401 acquires the number of pieces of data registered in the back-end processing status table (see FIG. 17) stored in the table storage service 403 to confirm the number of instances in the back-end processing unit 402 operating on the server computer group 102 and currently executing the task (more specifically, currently executing job processing).

FIG. 17 illustrates an example of the back-end processing status table that can be managed by the table storage service 403. The back-end processing status table illustrated in FIG. 17 includes an ETag field 1701 which stores a value automatically set by the table storage service 403. A unique value is written in the ETag field 1701 when column data is updated.

The back-end processing status table further includes a Partition Key field 1702 and a Row Key field 1703 that store ID information capable of uniquely identifying a column of the table. The back-end processing status table can be used to manage the above-described two values as ID information.

These values, stored in the Partition Key field 1702 and the Row Key field 1703, are job ID values received by the request processing unit 401 in step S1506 illustrated in FIG. 15 (more specifically, job ID values used when the request processing unit 401 transmits the message addition request in step S1511). A management method similar to the job management table illustrated in FIG. 7 can be used to manage the above-described values as two values.

The back-end processing status table further includes a registration time field 1704 that stores time information automatically set by the table storage service 403 when the back-end processing unit 402 adds information to the back-end processing status table.

Further, in step S1603, the request processing unit 401 acquires the total number of instances in the back-end processing unit 402 operating on the server computer group 102. FIG. 18 illustrates an example of information (a setting file) that can define the total number of the instances in the back-end processing unit 402 operating on the server computer group 102.

The information (setting file) illustrated in FIG. 18 is an information definition XML file 1801. The information definition XML file 1801 includes number-of-instances definition information 1802. The information definition XML file 1801 is stored in the indirect storage unit 303 of each server computer included in the server computer group 102. In other words, the total number of existing information definition XML files 1801 (same content files) is equal to the number of the server computers that constitute the server computer group 102.

In step S1603 illustrated in FIG. 16, the request processing unit 401 reads a numerical value from the description of the number-of-instances definition information 1802 in the information definition XML file 1801, which is stored in the indirect storage unit 303 of any one of the server computers constituting the server computer group 102. The request processing unit 401 identifies the total number of instances in the back-end processing unit 402 based on the numerical value read from the number-of-instances definition information 1802.

Next, in step S1604, the request processing unit 401 compares the number of the instances that are currently executing the task (i.e., the value acquired in the above-described step S1602) with the total number of instances acquired in the above-described step S1603. Based on a result of the above-described comparison, the request processing unit 401 determines whether a task to be executed next by the back-end processing unit 402 in response to user's uploading of document data (i.e., job processing corresponding to a new request) is immediately executable.

If it is determined that the total number of the instances is not greater than (i.e. less than or equal to) the number of the instances currently executing the task (namely, when there is not any instance that is not currently executing the task (i.e., not currently executing the job processing)) (NO in step S1604), the request processing unit 401 determines that the back-end processing unit 402 cannot immediately execute a new task (more specifically, job processing corresponding to a new request).

On the other hand, if it is determined that the total number of the instances is greater than the number of the instances currently executing the task (namely, when there is at least one instance that is not currently executing the task) (YES in step S1604), the request processing unit 401 determines that the back-end processing unit 402 can immediately execute a new task.

Figure 21:
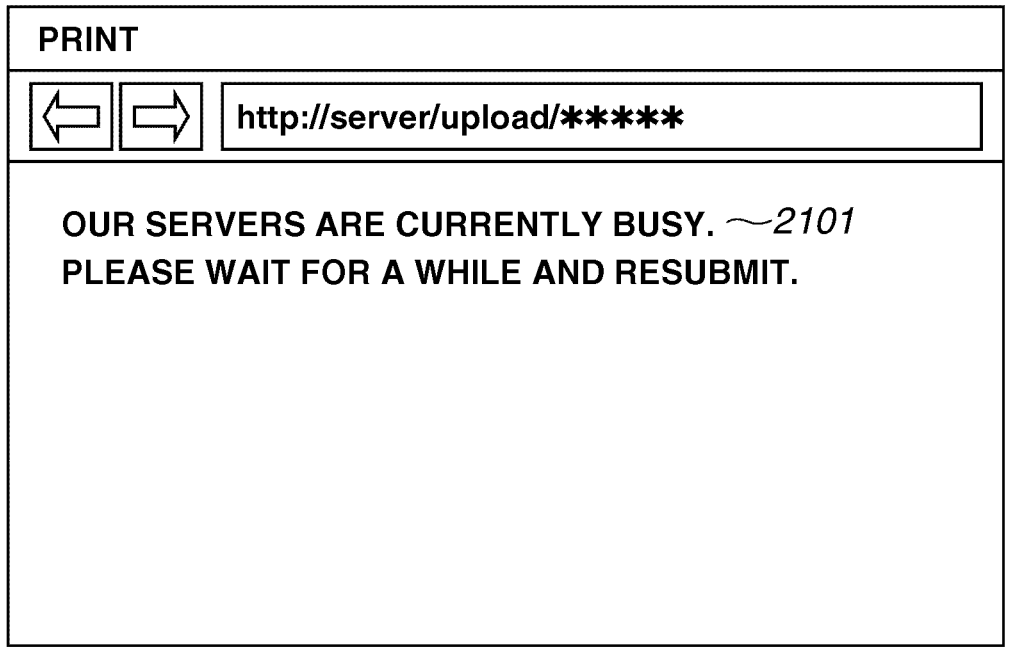
FIG. 21 illustrates an example of a document upload standby screen according to an exemplary embodiment of the present invention.

If in step S1604 the request processing unit 401 determines that the back-end processing unit 402 cannot immediately execute a new task, then in step S1608, the request processing unit 401 generates a document upload standby screen (see FIG. 21). More specifically, the request processing unit 401 performs control in such a way as to prevent the user from entering a new request via the browser 407.

On the other hand, if in step S1604 the request processing unit 401 determines that the back-end processing unit 402 can immediately execute a new task, the processing of the request processing unit 401 proceeds to step S1605. In step S1605, the request processing unit 401 transmits a sequence acquisition request to the table storage service 403 that stores the service sequence table. The processing to be performed in steps S1602 to S1604 corresponds to the processing performed in step S1502 illustrated in FIG. 15. More specifically, the request processing unit 401 performs control in such a way as to enable the user to enter a new request via the browser 407.

The processing to be performed in step S1605 is similar to the above-described processing performed in steps S1503 and S1504. The processing to be performed in step S1606 is similar to the above-described processing performed in steps S1505 and S1506.

Next, in step S1607, the request processing unit 401 generates the document upload screen (see FIG. 11).

In step S1609, the request processing unit 401 transmits the document upload screen (see FIG. 11) generated in step S1607 or the document upload standby screen (see FIG. 21) generated in step S1608 to the browser 407. Therefore, the browser 407 can receive the screen transmitted from the request processing unit 401.

In step S1610, the browser 407 acquires the screen transmitted from the request processing unit 401 and displays the acquired screen. The processing to be performed in step S1610 is similar to the processing performed in step S1507 illustrated in FIG. 15.

FIG. 21 illustrates an example of the document upload standby screen that can be displayed by the browser 407. The document upload standby screen illustrated in FIG. 21 includes an upload standby message area 2101. The upload standby message area 2101 displays a message informing the user that the back-end processing unit 402 cannot immediately execute a task and the user is requested to resubmit the document upload screen request after waiting for a while.

Next, in step S1611, the browser 407 determines whether the screen received in the above-described step S1610 is the document upload screen (see FIG. 11) generated in step S1607. If it is determined that the received screen is the document upload standby screen (see FIG. 21) generated in the above-described step S1608 (NO in step S1611), the browser 407 terminates the sequential processing.

On the other hand, if it is determined that the received screen is the document upload screen (see FIG. 11) generated in step S1607 (YES in step S1611), the processing of the browser 407 proceeds to step S1612. In step S1612, the browser 407 accepts document data uploaded from the user via the document upload screen (see FIG. 11). Then, the processing of the browser 407 proceeds to step S1612. Processing to be performed in step S1612 is similar to the processing performed in step S1508 illustrated in FIG. 15.

In step S1613, the request processing unit 401 receives the uploaded document data from the browser 407. Subsequently, the processing of the request processing unit 401 proceeds to step S1614. Processing to be performed in step S1614 is similar to the processing performed in step S1509 illustrated in FIG. 15. Processing to be performed in step S1615 is similar to the processing performed insteps S1510 and S1511 illustrated in FIG. 15. Processing to be performed in step S1616 is similar to the processing performed in step S1512 illustrated in FIG. 15.

Next, in step S1617, the browser 407 displays the document data upload success screen (see FIG. 20). The job ID acquired in the above-described step S1606 (step S1506 in FIG. 15) is preliminarily displayed in the authentication information display area 2002 of the document data upload success screen.

Further, compared to the document data upload success screen 1200 illustrated in FIG. 12, the update button 1203 is not displayed in the document data upload success screen illustrated in FIG. 20. The user's print target document data registration operation is completed through the above-described processing.

The print target document data conversion (to print data) operation performed in steps S1520 to S1543 illustrated in FIG. 15 is similar to the processing performed in steps S1030 to S1053 illustrated in FIG. 10. However, the message acquisition request processing in steps S1520 and S1533 and the message deletion request processing in steps S1532 and S1543 are different from the processing of the sequence illustrated in FIG. 10. The back-end processing unit 402 performs processing for adding and deleting information to and from the back-end processing status table (see FIG. 17), as described below with reference to a flowchart illustrated in FIG. 19.

Figure 19:
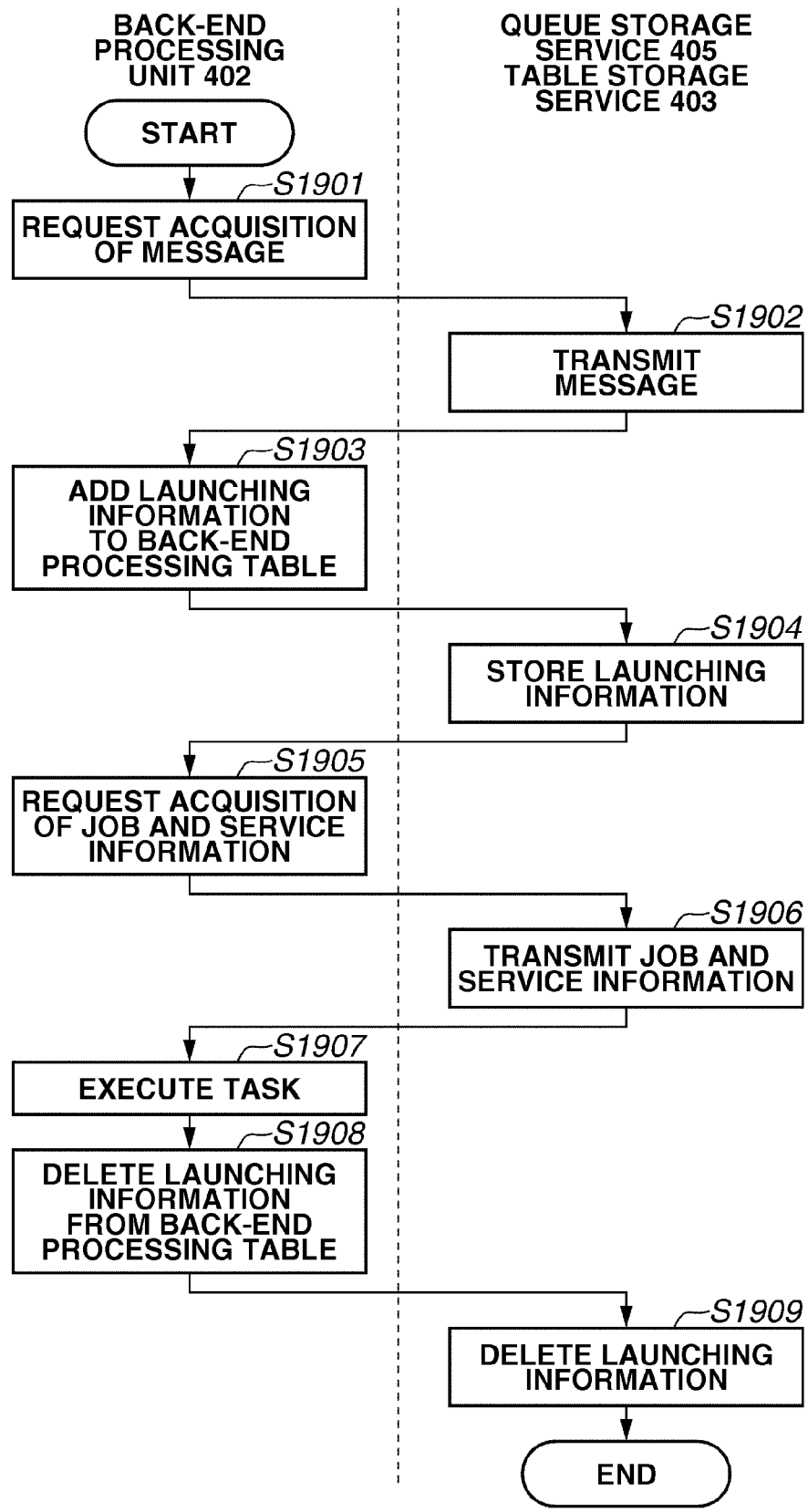
FIG. 19 is a flowchart illustrating a flow of sequential processing that can be performed when the back-end processing unit updates the back-end processing status table in launching and termination operations according to an exemplary embodiment of the present invention.

FIG. 19 is a flowchart illustrating a flow of sequential processing that can be performed when the back-end processing unit updates the back-end processing status table in launching and termination operations according to an exemplary embodiment of the present invention.

In step S1901, the back-end processing unit 402 periodically transmits a message acquisition request to the queue storage service 405. If the queue storage service 405 receives the message acquisition request from the back-end processing unit 402, then in step S1902, the queue storage service 405 tries to acquire a message (see FIG. 6) from the queue. If the message can be acquired from the queue, the queue storage service 405 extracts job ID information from the <MessageText> area 603 and transmits the acquired job ID information to the back-end processing unit 402. Therefore, the back-end processing unit 402 can receive the job ID information.

If the back-end processing unit 402 receives the job ID information from the queue storage service 405, then in step S1903, the back-end processing unit 402 transmits a launching information addition request to the table storage service 403 and transmits the job ID information acquired in the above-described step S1902 to be added to the back-end processing status table (see FIG. 17).

If the table storage service 403 receives the launching information addition request from the back-end processing unit 402, then in step S1904, the table storage service 403 registers the received job ID information into the back-end processing status table (see FIG. 17).

Next, in step S1905, the back-end processing unit 402 transmits a job and service information acquisition request together with the job ID information acquired in the above-described step S1902 to the table storage service 403.

If the table storage service 403 receives the job and service information acquisition request, then in step S1906, the table storage service 403 acquires job information corresponding to the job ID (see 702 and 703) from the job management table (see FIG. 7). Next, the table storage service 403 acquires ID information of a service that provides a task to be executed next (service ID of a task corresponding to the next task in the LastTask field 708) from the acquired job information.

Further, the table storage service 403 acquires service information corresponding to the service ID (see 803) from the service table (see FIG. 8). Then, the table storage service 403 transmits the acquired job information and service information to the back-end processing unit 402. Therefore, the back-end processing unit 402 can receive the job information and service information.

In step S1907, the back-end processing unit 402 executes the task based on the acquired job information and service information.

In step S1908, the back-end processing unit 402 transmits a launching information deletion request to the table storage service 403 that stores the back-end processing status table (see FIG. 17), if termination of the task execution is confirmed, and transmits the job ID information acquired in step S1902 to be deleted from the back-end processing status table.

If the table storage service 403 receives the launching information deletion request, then in step S1909, the table storage service 403 deletes information corresponding to the job ID information included in the received launching information deletion request from the information registered in the back-end processing status table (see FIG. 17).

Performing the processing of the flowchart illustrated in FIG. 19 as described above before or after the back-end processing unit 402 executes a task can realize the processing for adding and deleting information to and from the back-end processing status table (see FIG. 17) managed by the table storage service 403. Thus, the request processing unit 401 can execute the processing of step S1602 illustrated in FIG. 16.

Through the above-described processing, determining whether a user's request of printing document data is immediately executable becomes feasible by referring to the number of the instances in the back-end processing unit 402 that are currently executing the task and the total number of the back-end processing instances at the time when the user requests printing of the document data.

In the above-described steps S1602 to S1604 illustrated in FIG. 16, the number of instances in the back-end processing unit 402 that are currently executing the task is compared with the total number of the back-end processing instances. If the total number of the back-end processing instances is greater than the number of the instances in the back-end processing unit 402 that are currently executing the task, it is determined that a new request is immediately executable.

On the other hand, if the total number of the back-end processing instances is not greater than (i.e. less than or equal to) the number of the instances in the back-end processing unit 402 that are currently executing the task, it is determined that a new request is not immediately executable.

However, instead of using the number of the instances in the back-end processing unit 402 that are currently executing the task at the time when the user requests printing of the document data, it is also useful to use the number of messages stored in the queue storage service 405, or the number of unfinished jobs stored in the job management table at the time when the user requests printing of the document data. In the present exemplary embodiments, the unfinished job is a job whose status is Ready (preparation completed) or Processing (processing in progress) in the Status field 706.

According to the above-described configuration, the processing to be performed in steps S1602 to S1604 illustrated in FIG. 16 is changed in the following manner.

In step S1602 illustrated in FIG. 16, the request processing unit 401 acquires the number of messages stored in the queue storage service 405 (or the number of unfinished jobs stored in the job management table). Further, in step S1603, the request processing unit 401 acquires the total number back-end processing instances. Further, in step S1604, the request processing unit 401 compares the acquired number of the messages (or the acquired number of the unfinished jobs) with the total number of the back-end processing instances.

Then, if the total number of the back-end processing instances is greater than the number of the messages (or the number of the unfinished jobs), the request processing unit 401 determines that a new request is immediately executable. On the other hand, if the total number of the back-end processing instances is not greater than (i.e. less than or equal to) the number of the messages (or the number of the unfinished jobs), the request processing unit 401 determines that a new request is not immediately executable. The above-described configuration is thus employable.

Through the above-described configuration, determining whether the user's request of printing document data is immediately executable becomes feasible by referring to the number of messages stored in the queue storage service 405 (or the number of unfinished jobs stored in the job management table) and the total number of the back-end processing instances at the time when the user requests printing of the document data.

As described above, the present exemplary embodiment can improve usability of a network printing system by enabling each user to be disconnected in advance from the network printing system without waiting for completion of server processing on document data uploaded by the user. More specifically, authentication information, which is required when an image forming apparatus performs print processing, can be returned to a client terminal without waiting for completion of server processing on document data uploaded from the client terminal.

The network system according to an exemplary embodiment of the present invention is not limited to the above-described examples of the network printing system. For example, the computer resources that can be used by the server computer group 102 are not limited to the document server 103, the image forming apparatus 104, the document extraction server 107, the document conversion server 108, and the print server 109.

Another usable computer resource can be any server having the capability of executing processing according to an instruction from the back-end processing unit 402 of the server computer group 102. For example, an example computer resource is a data processing server that performs data processing (e.g., data analysis processing and statistical processing) or a data server that stores a result of the data processing.

Further, the request to be transmitted from the browser 407 to the request processing unit 401 may be a data processing request that requests to perform data processing (e.g., analysis processing and statistical processing) on data uploaded from the browser 407 and store a result of the data processing to the data server.

If the request processing unit 401 accepts the data processing request, the back-end processing unit 402 processes a job corresponding to the data processing request asynchronously with the acceptance of the request. More specifically, the back-end processing unit 402 causes the data processing server to perform data processing on the data corresponding to the data processing request. Further, the back-end processing unit 402 causes the data server to store a result of the data processing. Thus, the back-end processing unit 402 can complete job processing corresponding to the data processing request.

Even in the above-described example, as illustrated in FIG. 15, the request processing unit 401 transmits authentication information to the browser 407, without waiting for completion of the job processing corresponding to the data processing request. The transmitted authentication information enables a user of the browser 407 to acquire the result of the job processing corresponding to the data processing request (data processing result).

Further, as illustrated in FIG. 16, the request processing unit 401 determines whether the back-end processing unit 402 can immediately execute the job processing corresponding to the data processing request before accepting the data processing request. Then, if it is determined that the back-end processing unit 402 cannot immediately execute the job processing, the request processing unit 401 performs control in such a way as not to accept the data processing request. On the other hand, if it is determined that the back-end processing unit 402 can immediately execute the job processing, the request processing unit 401 performs control in such a way as to accept the data processing request.

As described above, according to the exemplary embodiments of the present invention, each client computer can be disconnected from a network system without waiting for completion of processing in the network system that responds to a request from the client computer. Therefore, the exemplary embodiments of the present invention can improve usability of the network system. As a result, the client computer can transmit a next request to the network system before the network system completes the processing responding to the preceding request transmitted from the client computer.

It is needless to say that the configurations and contents of various data are not limited to the above-described examples and can be modified in various ways considering intended usages and purposes. The present invention is not limited to the above-described exemplary embodiments and can be embodied, for example, as a system, an apparatus, a method, a program, or a storage medium. More specifically, the present invention can be applied to a system including a plurality of devices and can be applied to an apparatus constructed as a single device.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-036173 filed Feb. 22, 2010, which is hereby incorporated by reference herein in its entirety.

What is claimed is:

1. A network system including at least one server computer that is capable of communicating with a client computer, the network system comprising:

a first processing unit configured to accept a request transmitted from the client computer and to register a job that processes the accepted request into a storage unit, wherein the first processing unit includes a processing unit; and a second processing unit configured to acquire the job from the storage unit asynchronously with the job being registered into the storage unit and to process the acquired job, wherein the second processing unit includes a processing unit, wherein the first processing unit is configured to:

transmit authentication information usable to acquire a processing result of the job corresponding to the request to the client computer without waiting for the second processing unit to complete processing of the job registered in the storage unit;

determine whether processing of a job corresponding to a request newly transmitted from the client computer is immediately executable by the second processing unit;

perform control in such a way as not to accept a new request from the client computer if it is determined that the processing is not immediately executable by the second processing unit;

perform control in such a way as to accept a new request from the client computer if it is determined that the processing is immediately executable by the second processing unit;

compare a total number of processing units in the second processing unit with a number of processing units in the second processing unit that are currently executing processing of the job;

determine that processing of the job corresponding to the newly transmitted request is not immediately executable by the second processing unit if it is determined that the total number of processing units in the second processing unit is less than or equal to the number of processing units in the second processing unit that are currently executing processing of the job; and determine that processing of the job corresponding to the newly transmitted request is immediately executable by the second processing unit if it is determined that the total number of processing units in the second processing unit is greater than the number of processing units in the second processing unit that are currently executing processing of the job.

2. The network system according to claim 1, wherein the first processing unit is configured to:

compare a total number of processing units in the second processing unit with a number of unfinished jobs registered in the storage unit;

determine that processing of the job corresponding to the newly transmitted request is not immediately executable by the second processing unit if it is determined that the total number of processing units in the second processing unit is less than or equal to the number of unfinished jobs; and determine that processing of the job corresponding to the newly transmitted request is immediately executable by the second processing unit if it is determined that the total number of processing units in the second processing unit is greater than the number of unfinished jobs.

3. The network system according to claim 1, wherein the authentication information includes identification information for identifying the job.

4. The network system according to claim 3, wherein the second processing unit is configured to execute processing of the job using one or a plurality of computer resources that are usable by the at least one server computer.

5. The network system according to claim 4, wherein the one or a plurality of computer resources includes a computer resource configured to convert document data into print data of a data format printable by an image forming apparatus, and a computer resource configured to store the print data, wherein the first processing unit is configured to transmit the print data stored in the computer resource to the image forming apparatus according to the authentication information transmitted from the image forming apparatus.

6. The network system according to claim 5, wherein the request includes processing for converting document data uploaded from the client computer to the network system into print data of a data format printable by the image forming apparatus and storing the print data in the computer resource.

7. A method for controlling a network system including at least one server computer that is capable of communicating with a client computer, the method comprising:

via a first processing unit including a processing unit of the network system, accepting a request transmitted from the client computer, and registering a job that processes the accepted request into a storage unit;

via a second processing unit including a processing unit of the network system, acquiring the job from the storage unit asynchronously with the job being registered into the storage unit, and processing the acquired job;

via the first processing unit:

transmitting authentication information usable to acquire a processing result of the job corresponding to the request to the client computer without waiting for the second processing unit to complete processing of the job registered in the storage unit;

determining whether processing of a job corresponding to a request newly transmitted from the client computer is immediately executable by the second processing unit;

performing control in such a way as not to accept a new request from the client computer if it is determined that the processing is not immediately executable by the second processing unit; and performing control in such a way as to accept a new request from the client computer if it is determined that the processing is immediately executable by the second processing unit;

comparing a total number of processing units in the second processing unit with a number of processing units in the second processing unit that are currently executing processing of the job;

determining that processing of the job corresponding to the newly transmitted request is not immediately executable by the second processing unit if it is determined that the total number of processing units in the second processing unit is less than or equal to the number of processing units in the second processing unit that are currently executing processing of the job; and determining that processing of the job corresponding to the newly transmitted request is immediately executable by the second processing unit if it is determined that the total number of processing units in the second processing unit is greater than the number of processing units in the second processing unit that are currently executing processing of the job.

8. The method according to claim 7, wherein via the first processing unit, comparing a total number of processing units in the second processing unit with a number of unfinished jobs registered in the storage unit;

determining that processing of the job corresponding to the newly transmitted request is not immediately executable by the second processing unit if it is determined that the total number of processing units in the second processing unit is less than or equal to the number of unfinished jobs; and determining that processing of the job corresponding to the newly transmitted request is immediately executable by the second processing unit if it is determined that the total number of processing units in the second processing unit is greater than the number of unfinished jobs.

9. The method according to claim 7, wherein the authentication information includes identification information for identifying the job.

10. The method according to claim 9, wherein via the second processing unit, executing processing of the job using one or a plurality of computer resources that are usable by the at least one server computer.

11. The method according to claim 10, wherein the one or the plurality of computer resources includes a computer resource configured to convert document data into print data of a data format printable by an image forming apparatus, and a computer resource configured to store the print data, wherein via the first processing unit, transmitting the print data stored in the computer resource to the image forming apparatus according to the authentication information transmitted from the image forming apparatus.

12. The method to claim 11, wherein the request includes processing for converting document data uploaded from the client computer to the network system into print data of a data format printable by the image forming apparatus and storing the print data in the computer resource.

13. A non-transitory computer-readable storage medium storing computer-executable instructions that cause a computer to perform a method for controlling a network system including at least one server computer that is capable of communicating with a client computer, the method comprising:

via a first processing unit including a processing unit of the network system, accepting a request transmitted from the client computer, and registering a job that processes the accepted request into a storage unit;

via a second processing unit including a processing unit of the network system, acquiring the job from the storage unit asynchronously with the job being registered into the storage unit, and processing the acquired job; and via the first processing unit;

transmitting authentication information usable to acquire a processing result of the job corresponding to the request to the client computer without waiting for the second processing unit to complete processing of the job registered in the storage unit;

determining whether processing of a job corresponding to a request newly transmitted from the client computer is immediately executable by the second processing unit;

performing control in such a way as not to accept a new request from the client computer if it is determined that the processing is not immediately executable by the second processing unit; and performing control in such a way as to accept a new request from the client computer if it is determined that the processing is immediately executable by the second processing unit;

comparing a total number of processing units in the second processing unit with a number of processing units in the second processing unit that are currently executing processing of the job;

determining that processing of the job corresponding to the newly transmitted request is not immediately executable by the second processing unit if it is determined that the total number of processing units in the second processing unit is less than or equal to the number of processing units in the second processing unit that are currently executing processing of the job; and determining that processing of the job corresponding to the newly transmitted request is immediately executable by the second processing unit if it is determined that the total number of processing units in the second processing unit is greater than the number of processing units in the second processing unit that are currently executing processing of the job.

* * * * *